United States Patent
Gomi et al.

(10) Patent No.: US 9,495,884 B2
(45) Date of Patent: Nov. 15, 2016

(54) ASSIGNMENT SHARING DEVICE, ASSIGNMENT SHARING METHOD, AND NON-TRANSITORY COMPUTER-READABLE RECORDING MEDIUM

(71) Applicant: YAHOO JAPAN CORPORATION, Tokyo (JP)

(72) Inventors: Hidehito Gomi, Tokyo (JP); Teruhiko Teraoka, Tokyo (JP);
(Continued)

(73) Assignee: YAHOO JAPAN CORPORATION, Tokyo (JP)

( * ) Notice: Subject to any disclaimer, the term of this patent is extended or adjusted under 35 U.S.C. 154(b) by 306 days.

(21) Appl. No.: 14/178,994

(22) Filed: Feb. 12, 2014

(65) Prior Publication Data
US 2014/0234823 A1 Aug. 21, 2014

(30) Foreign Application Priority Data
Feb. 21, 2013 (JP) .................................. 2013-032376

(51) Int. Cl.
*G06F 17/00* (2006.01)
*G09B 5/08* (2006.01)
(Continued)

(52) U.S. Cl.
CPC .............. *G09B 5/08* (2013.01); *G06F 21/6218* (2013.01); *G06Q 10/06* (2013.01); *G06Q 10/101* (2013.01);
(Continued)

(58) Field of Classification Search
CPC ................... G06Q 30/08; G06Q 20/223; G06Q 10/06; G06Q 10/101; G06Q 20/00;
(Continued)

(56) References Cited

U.S. PATENT DOCUMENTS 7,162,429 B1 * 1/2007 Delgado .............. G06Q 20/382
705/50
8,892,673 B1 * 11/2014 Emigh .................... G06F 21/36
709/207
(Continued)

FOREIGN PATENT DOCUMENTS

JP    A-2007-65111    3/2007

OTHER PUBLICATIONS

Sep. 16, 2014 Office Action issued in Japanese Application No. 2013-032376.

*Primary Examiner* — Nathan Hillery
(74) *Attorney, Agent, or Firm* — Oliff PLC

(57) ABSTRACT

An assignment sharing device includes an assignment-related information storage unit configured to store assignment-related information including assignment information, challenger identification information, assignment approval information, and assignment achievement status information; an assignment information receiving unit configured to receive the assignment information and so forth; an assignment-related information accumulating unit configured to accumulate the assignment information and so forth as a single piece of assignment-related information; an assignment information transmitting unit configured to transmit corresponding assignment information to a challenger; an assignment approval receiving unit configured to receive assignment identification information identifying an assignment approved by the challenger; an assignment approving unit configured to set assignment approval information; and an assignment result information receiving unit configured to receive assignment result information, which is information regarding an execution result of an assignment represented by the assignment information corresponding to the set assignment approval information.

15 Claims, 11 Drawing Sheets

(72) Inventors: Kota Tsubouchi, Tokyo (JP);
Nobuyuki Shimizu, Tokyo (JP)

(51) Int. Cl.
| | |
|---|---|
| *G06Q 20/14* | (2012.01) |
| *G06Q 20/00* | (2012.01) |
| *G06Q 10/06* | (2012.01) |
| *G06Q 20/22* | (2012.01) |
| *G06Q 30/08* | (2012.01) |
| *G06Q 30/02* | (2012.01) |
| *G06Q 30/06* | (2012.01) |
| *G06Q 50/18* | (2012.01) |
| *G06Q 20/02* | (2012.01) |
| *G06Q 10/10* | (2012.01) |
| *G06F 21/62* | (2013.01) |
| *G09B 5/00* | (2006.01) |

(52) U.S. Cl.
CPC .............. *G06Q 20/00* (2013.01); *G06Q 20/02* (2013.01); *G06Q 20/14* (2013.01); *G06Q 20/223* (2013.01); *G06Q 30/02* (2013.01); *G06Q 30/06* (2013.01); *G06Q 30/08* (2013.01); *G06Q 50/188* (2013.01); *G09B 5/00* (2013.01); *G06F 2221/2141* (2013.01)

(58) Field of Classification Search
CPC ................... G06Q 20/02; G06Q 20/14; G06Q 30/02; G06Q 30/06; G06Q 50/188; G06F 21/6218; G06F 2221/2141
See application file for complete search history.

(56) References Cited

U.S. PATENT DOCUMENTS

| | | | |
|---|---|---|---|
| 9,129,088 B1* | 9/2015 | Baschy | G06F 21/10 |
| 2005/0108153 A1* | 5/2005 | Thomas | G06Q 20/00 |
| | | | 705/39 |
| 2006/0053075 A1* | 3/2006 | Roth | G06Q 10/06 |
| | | | 705/50 |
| 2006/0136323 A1* | 6/2006 | Barry | G06Q 30/08 |
| | | | 705/37 |
| 2006/0136325 A1* | 6/2006 | Barry | G06Q 10/087 |
| | | | 705/37 |
| 2007/0239464 A1* | 10/2007 | Carroll | G06Q 10/10 |
| | | | 705/300 |
| 2008/0262969 A1* | 10/2008 | Samid | G06Q 20/04 |
| | | | 705/64 |

* cited by examiner

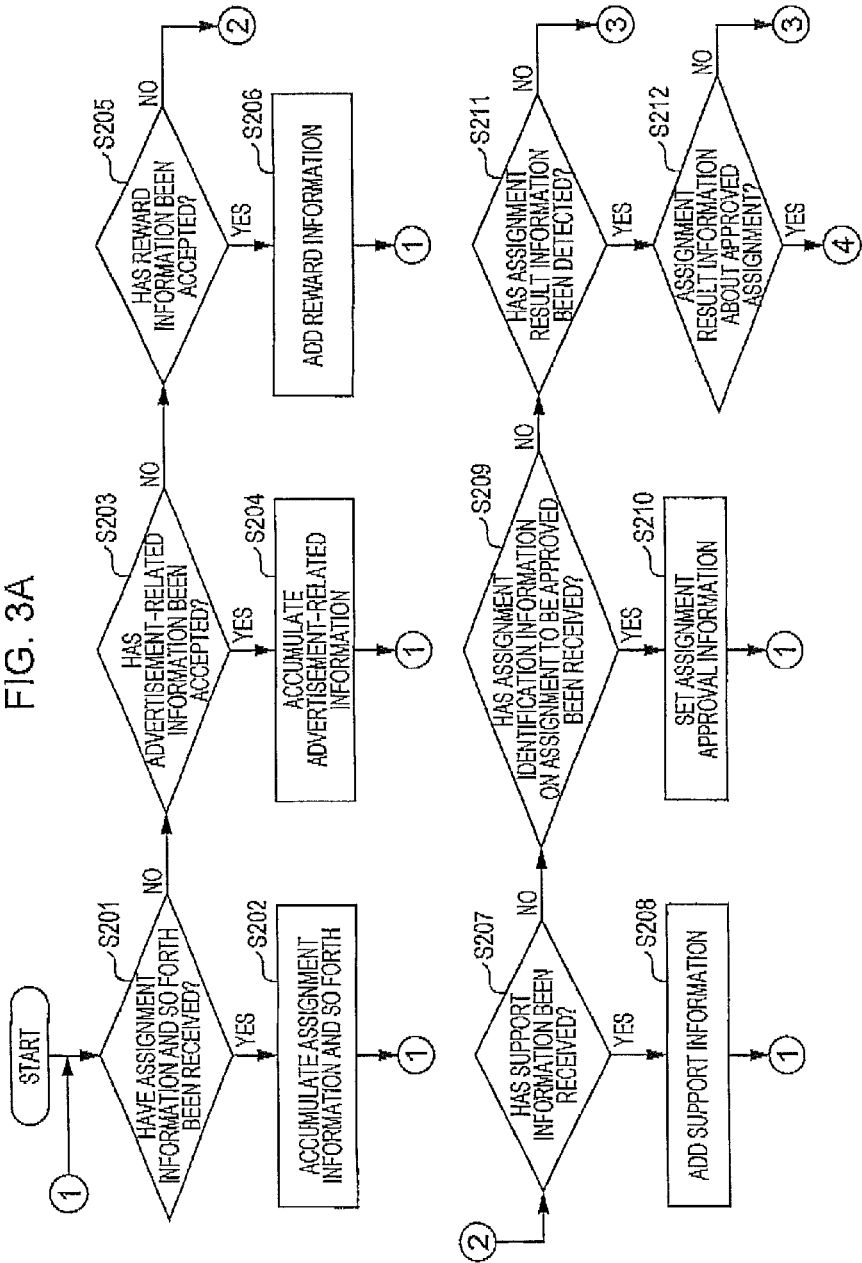

FIG. 4

| USER A | USER B | DEGREE OF INTIMACY |
|---|---|---|
| USER 1 | USER 2 | 2 |
| USER 1 | USER 3 | 1 |
| USER 1 | USER 4 | 3 |
| ⋮ | ⋮ | ⋮ |
| ⋮ | ⋮ | ⋮ |
| USER 10 | USER 21 | 5 |
| ⋮ | ⋮ | ⋮ |
| ⋮ | ⋮ | ⋮ |

FIG. 5

| ASSIGNMENT ID | ASSIGNMENT INFORMATION | ASSIGNMENT-RELATED INFORMATION ||||||||| 
| | | PROPOSER IDENTIFICATION INFORMATION | CHALLENGER IDENTIFICATION INFORMATION | ASSIGNMENT APPROVAL INFORMATION | ASSIGNMENT ACHIEVEMENT STATUS INFORMATION | SUPPORT INFORMATION | REWARD INFORMATION | ADVERTISEMENT IDENTIFICATION INFORMATION | ASSIGNMENT SUITABILITY | ASSIGNMENT ACHIEVEMENT CONDITION |
| --- | --- | --- | --- | --- | --- | --- | --- | --- | --- | --- |
| ... | ... | ... | ... | ... | ... | ... | ... | ... | ... | ... |
| 101 | RUN 20 km | USER 10 | USER 21 | APPROVED | ACHIEVED | · GO FOR IT<br>· YOU CAN DO IT | 100 YEN | 204 | 5 | TRAVEL 20 km OR MORE AT 6 km/h |
| 102 | PARTICIPATE IN RADIO CALISTHENICS FOR ONE WEEK | USER 10 | USER 14 | UNAPPROVED | UNACHIEVED | — | — | — | 2 | |
| 103 | GET 700 MARKS IN TOEIC | USER 13 | USER 21 | UNAPPROVED | UNACHIEVED | — | — | 201 | 3 | |
| 104 | TRAVEL THROUGH SPACE | USER 1 | USER 21 | UNAPPROVED | UNACHIEVED | — | — | — | 1 | TRANSMIT PHOTO OF THE EARTH |
| 105 | TRAVEL AROUND ALL THE PREFECTURES | USER 15 | USER 21 | UNAPPROVED | UNACHIEVED | · YOU CAN TRY | 50 YEN | — | 4 | TRANSMIT CURRENT GPS COORDINATES OF ALL THE PREFECTURES |

FIG. 6

| ADVERTISEMENT ID | ADVERTISEMENT-RELATED INFORMATION | | |
|---|---|---|---|
| | ADVERTISEMENT INFORMATION | ADVERTISEMENT KEYWORD | ADVERTISEMENT COST INFORMATION |
| ... | ... | ... | ... |
| 201 | ULTIMATE SOLUTION FOR ENGLISH LEARNING! LEARNING FROM NATIVE ENGLISH SPEAKER (http://eng.sample) | ENGLISH, ENGLISH CONVERSATION | 10 YEN |
| 202 | MILD GINJOSHU MOONLIGHT (http://sake.sample) | SAKE, JAPANESE SAKE, GINJOSHU | 15 YEN |
| 203 | DEEP BASS SELECTED BY THE WORLD (http://spk.sample) | SOUND QUALITY, SPEAKER | 12 YEN |
| 204 | LIGHTEST SUPER RUNNING SHOES (http://srs.sample) | RUN, RUNNING SHOES, SHOES | 30 YEN |

FIG. 7

CURRENT ASSIGNMENT

- TRAVEL AROUND ALL THE PREFECTURES (USER 15 → USER 21)

[COMMENT]

- TRAVEL THROUGH SPACE (USER 1 → USER 21)

[COMMENT]

- GET 700 MARKS IN TOEIC (USER 10 → USER 21)

[COMMENT]

- PARTICIPATE IN RADIO CALISTHENICS FOR ONE WEEK (USER 10 → USER 14)

[COMMENT]

- RUN 20 km (USER 10 → USER 21)

[COMMENT]

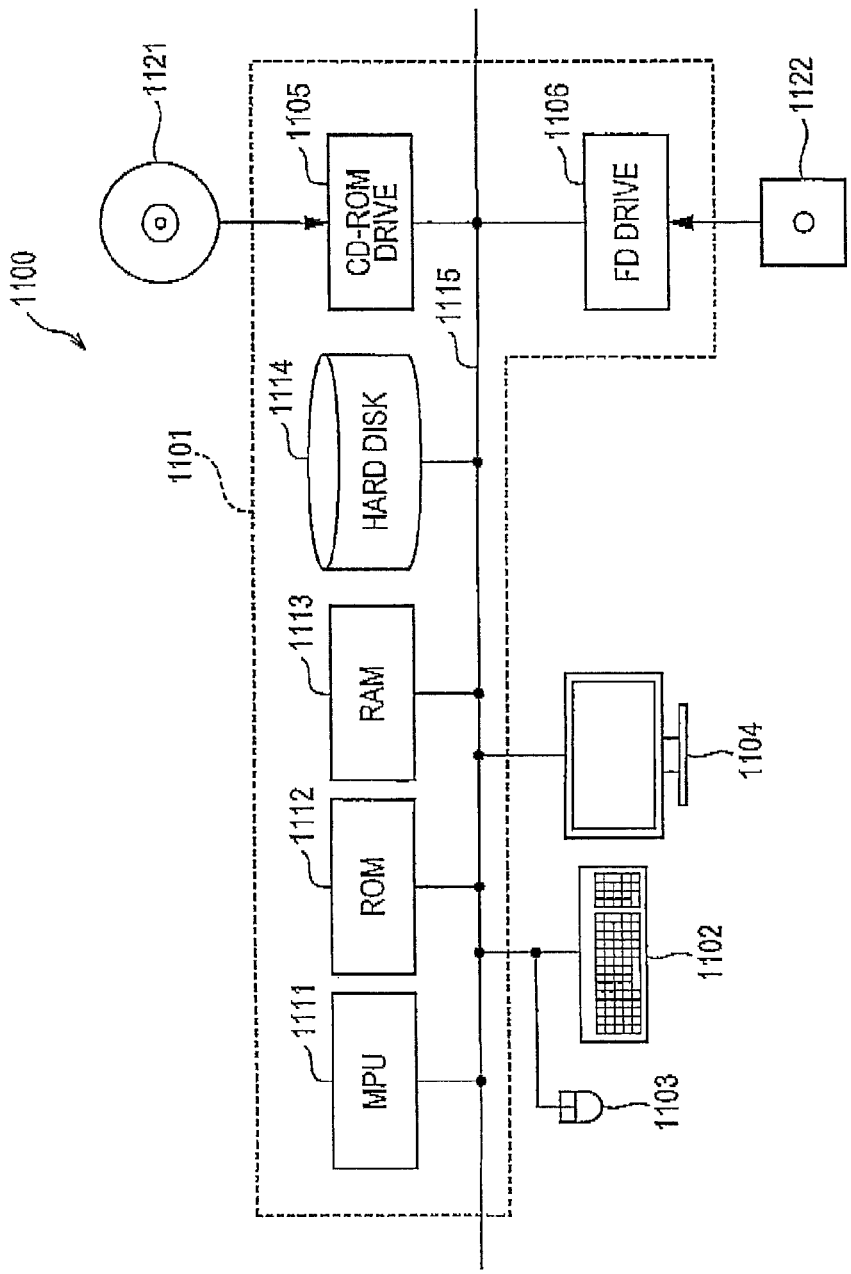

ASSIGNMENT SHARING DEVICE, ASSIGNMENT SHARING METHOD, AND NON-TRANSITORY COMPUTER-READABLE RECORDING MEDIUM

CROSS-REFERENCE TO RELATED APPLICATIONS

The present invention contains subject matter related to Japanese Patent Application No. 2013-032376 filed in the Japan Patent Office on Feb. 21, 2013, the entire contents of which are incorporated herein by reference.

BACKGROUND OF THE INVENTION

1. Field of the Invention

The present invention relates to an assignment sharing device, an assignment sharing method, and a non-transitory computer-readable recording medium that are configured to share an assignment.

2. Description of the Related Art

An education support system or the like in which an assignment is performed on the web has been developed (see, for example, Japanese Unexamined Patent Application Publication No. 2007-65111).

In the education support system or the like according to the related art, a mechanism for maintaining the motivation of a user who tries to attain a goal or challenge an assignment is not available, and it may be difficult for the user to continue challenging.

SUMMARY OF THE INVENTION

The present invention provides a mechanism and opportunity to incite a challenging spirit of a user.

According to an aspect of the present invention, there is provided an assignment sharing device including an assignment-related information storage unit, an assignment information receiving unit, an assignment-related information accumulating unit, an assignment information transmitting unit, an assignment approval receiving unit, an assignment approving unit, an assignment result information receiving unit, and an assignment achievement status information setting unit. The assignment-related information storage unit is configured to store assignment-related information, the assignment-related information including assignment information which is information representing an assignment, proposer identification information identifying a proposer of the assignment, challenger identification information identifying a challenger of the assignment, assignment approval information indicating whether or not the challenger has approved the assignment, and assignment achievement status information representing an achievement status of the assignment. The assignment information receiving unit is configured to receive assignment information, proposer identification information, and challenger identification information from a terminal device of a proposer. The assignment-related information accumulating unit is configured to accumulate the assignment information, the proposer identification information, and the challenger identification information received by the assignment information receiving unit in the assignment-related information storage unit so that the assignment information, the proposer identification information, and the challenger identification information are included in a single piece of assignment-related information. The assignment information transmitting unit is configured to transmit, to a terminal device of a challenger identified by the challenger identification information included in the assignment-related information stored in the assignment-related information storage unit, the assignment information included in the assignment-related information. The assignment approval receiving unit is configured to receive, from the terminal device of the challenger, assignment identification information identifying assignment information representing an assignment approved by the challenger. The assignment approving unit is configured to set assignment approval information included in the assignment-related information including the assignment information identified by the assignment identification information received by the assignment approval receiving unit. The assignment result information receiving unit is configured to receive assignment result information from the terminal device of the challenger, the assignment result information being information that is included in the assignment-related information together with challenger identification information identifying the challenger and that is related to an execution result of an assignment represented by the assignment information corresponding to the assignment approval information set by the assignment approving unit. The assignment achievement status information setting unit is configured to set, in accordance with the assignment result information received by the assignment result information receiving unit, assignment achievement status information included in the assignment-related information including assignment information representing an assignment related to the assignment result information.

The assignment result information may be information regarding an activity performed in an assignment. The assignment sharing device may further include an assignment result determining unit configured to determine, using the assignment result information received by the assignment result information receiving unit, whether or not an assignment regarding the assignment result information has been achieved. The assignment achievement status information setting unit may set information about a result generated by the assignment result determining unit to assignment achievement status information included in the assignment-related information including the assignment information regarding the assignment result information received by the assignment result information receiving unit.

The assignment sharing device may further include a score calculating unit and a proposed assignment information creating unit. The score calculating unit is configured to calculate a score for the assignment-related information stored in the assignment-related information storage unit, the score being a value indicating a degree of suitability, for a challenger identified by challenger identification information included in the assignment-related information, of an assignment represented by assignment information included in the assignment-related information. The proposed assignment information creating unit is configured to specify pieces of assignment-related information that are included in the assignment-related information stored in the assignment-related information storage unit and that have identical challenger identification information, and create, using at least a part of the specified pieces of assignment-related information, proposed assignment information which is assignment information to be proposed to a challenger in accordance with the score calculated by the score calculating unit. The assignment information transmitting unit may transmit the proposed assignment information created by the proposed assignment information creating unit.

The score calculating unit may calculate at least one of values including (i) a degree of encouragement, which is a value corresponding to the assignment-related information that is stored in the assignment-related information storage unit and that includes proposer identification information included in assignment-related information for which a score is to be calculated and challenger identification information included in the assignment-related information, (ii) proposer suitability, which is a value corresponding to the assignment-related information that is stored in the assignment-related information storage unit and that includes the proposer identification information included in the assignment-related information for which the score is to be calculated, and (iii) challenger suitability, which is a value corresponding to the assignment-related information that is stored in the assignment-related information storage unit and that includes the challenger identification information included in the assignment-related information for which the score is to be calculated, and may calculate a score using the calculated value.

The score calculating unit may calculate a score using at least one of values including (i) a degree of intimacy, which is a value corresponding to a relationship between a proposer identified by proposer identification information included in assignment-related information for which the score is to be calculated, and a challenger identified by challenger identification information included in the assignment-related information for which the score is to be calculated, and (ii) assignment suitability, which is a value corresponding to a relationship between the challenger identified by the challenger identification information included in the assignment-related information for which the score is to be calculated, and an assignment represented by assignment information included in the assignment-related information for which the score is to be calculated.

The assignment-related information may further include one or more pieces of support information, which is information regarding a support from a third party other than a proposer identified by proposer identification information included in the assignment-related information and a challenger identified by challenger identification information included in the assignment-related information. The assignment sharing device may further include a support information receiving unit and a support information adding unit. The support information receiving unit is configured to receive, from a terminal device of the third party, support information and assignment identification information identifying assignment information representing an assignment supported by the third party using the support information in association with each other. The support information adding unit is configured to add the support information received by the support information receiving unit to the assignment-related information including the assignment information identified by the assignment identification information associated with the support information. The score calculating unit may calculate a score using the support information included in the assignment-related information stored in the assignment-related information storage unit. The assignment information transmitting unit may transmit assignment information included in the assignment-related information also to the third party.

The assignment sharing device may further include an advertisement-related information storage unit, an advertisement information selecting unit, and an advertisement cost distributing unit. The advertisement-related information storage unit is configured to store advertisement-related information, the advertisement-related information including advertisement information which is information representing an advertisement to be transmitted together with assignment information and advertisement cost information representing advertisement cost for running an advertisement. The advertisement information selecting unit is configured to select advertisement information related to assignment information included in the assignment-related information from among pieces of advertisement information included in the advertisement-related information stored in the advertisement-related information storage unit. The advertisement cost distributing unit is configured to distribute at least a part of advertisement cost to a challenger. The assignment information transmitting unit may also transmit the advertisement information selected by the advertisement information selecting unit for assignment information to be transmitted. The advertisement cost distributing unit may distribute, in accordance with the assignment achievement status information set by the assignment achievement status information setting unit, at least a part of advertisement cost represented by advertisement cost information included in the advertisement-related information including the advertisement information selected by the advertisement information selecting unit for the assignment-related information, to a challenger identified by challenger identification information included in the assignment-related information including the assignment achievement status information.

The assignment-related information may further include reward information representing a reward for an assignment. The assignment sharing device may further include a reward distributing unit configured to distribute, in accordance with the assignment achievement status information set by the assignment achievement status information setting unit, at least a part of the reward represented by the reward information included in the assignment-related information, to a challenger identified by challenger identification information included in the assignment-related information including the assignment achievement status information.

According to the above-described assignment sharing device, a mechanism and opportunity to incite a challenging spirit of a user may be provided.

BRIEF DESCRIPTION OF THE DRAWINGS

FIGS. 3A and 3B are flowcharts illustrating an operation of the assignment sharing device according to the embodiment;

FIG. 4 is a diagram illustrating an example of degrees of intimacy stored in a degree-of-intimacy storage unit according to the embodiment;

FIG. 5 is a diagram illustrating an example of assignment-related information stored in an assignment-related information storage unit according to the embodiment;

FIG. 6 is a diagram illustrating an example of advertisement-related information stored in an advertisement-related information storage unit according to the embodiment;

FIG. 7 is a diagram illustrating an example of display of a screen for supporting an assignment according to the embodiment;

FIG. 10 is a diagram illustrating an example of the configuration of the computer system according to the embodiment.

DETAILED DESCRIPTION OF THE PREFERRED EMBODIMENT

Figure 1:
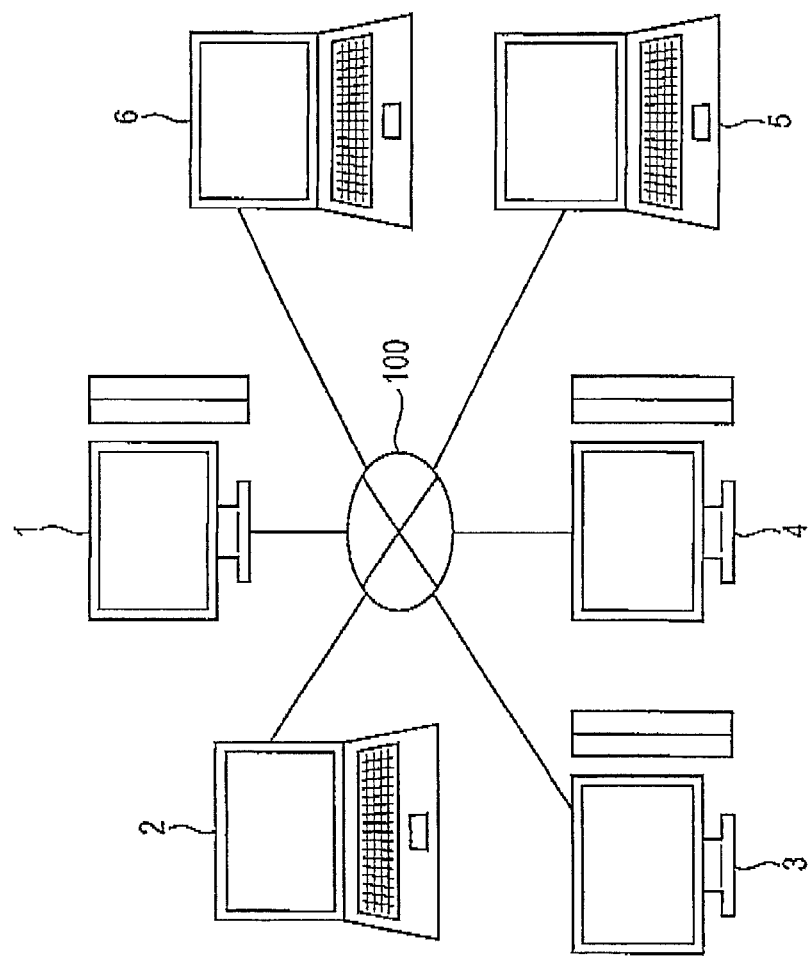
FIG. 1 is a conceptual diagram of a system including an assignment sharing device according to an embodiment.

Hereinafter, an assignment sharing device and so forth according to an embodiment will be described with reference to the attached drawings. In this embodiment, the elements denoted by the same reference numerals perform the same operation, and thus the corresponding description may be omitted.

In this embodiment, a description will be given of an assignment sharing device 1 that transmits an assignment to a challenger and receives an execution result regarding an assignment approved by the challenger.

FIG. 1 is a conceptual diagram of a system including the assignment sharing device 1 according to this embodiment. Referring to FIG. 1, the assignment sharing device 1, one or more proposer terminal devices 2, one or more challenger terminal devices 3, one or more supporter terminal devices 4, one or more advertiser terminal devices 5, and one or more sponsor terminal devices 6 are connected to one another via a network 100. The network 100 is a wired or wireless communication line, for example, the Internet, an intranet, a local area network (LAN), or a public telephone line. The proposer terminal device 2, the challenger terminal device 3, the supporter terminal device 4, the advertiser terminal devices 5, and the sponsor terminal device 6 may be any types of terminal devices as long as they are connectable to the network 100. For example, the proposer terminal device 2, the challenger terminal device 3, the supporter terminal device 4, the advertiser terminal device 5, and the sponsor terminal device 6 may be desktop personal computers, notebook personal computers, smart phones, personal digital assistants (PDAs), or the like. The advertiser terminal device 5 and the sponsor terminal device 6 may be the same as or different from the assignment sharing device 1. The proposer terminal device 2, the challenger terminal device 3, the supporter terminal device 4, the advertiser terminal device 5, and the sponsor terminal device 6 are described as different devices for convenience, but the names of these devices may be changed in accordance with an action performed by a user. Also, a proposer, a challenger, a supporter, an advertiser, and a sponsor are described as different persons for convenience, but depending on a situation, some of these persons may be the same person or may always be different persons. The proposer, the challenger, the supporter, the advertiser, and the sponsor may be changed for each assignment. For example, a proposer of a certain assignment may be a challenger of another assignment. The proposer terminal device 2 is used by a proposer, the challenger terminal device 3 is used by a challenger, the supporter terminal device 4 is used by a supporter, the advertiser terminal device 5 is used by an advertiser, and the sponsor terminal device 6 is used by a sponsor. The ownership of each terminal device is not specified.

Figure 2:
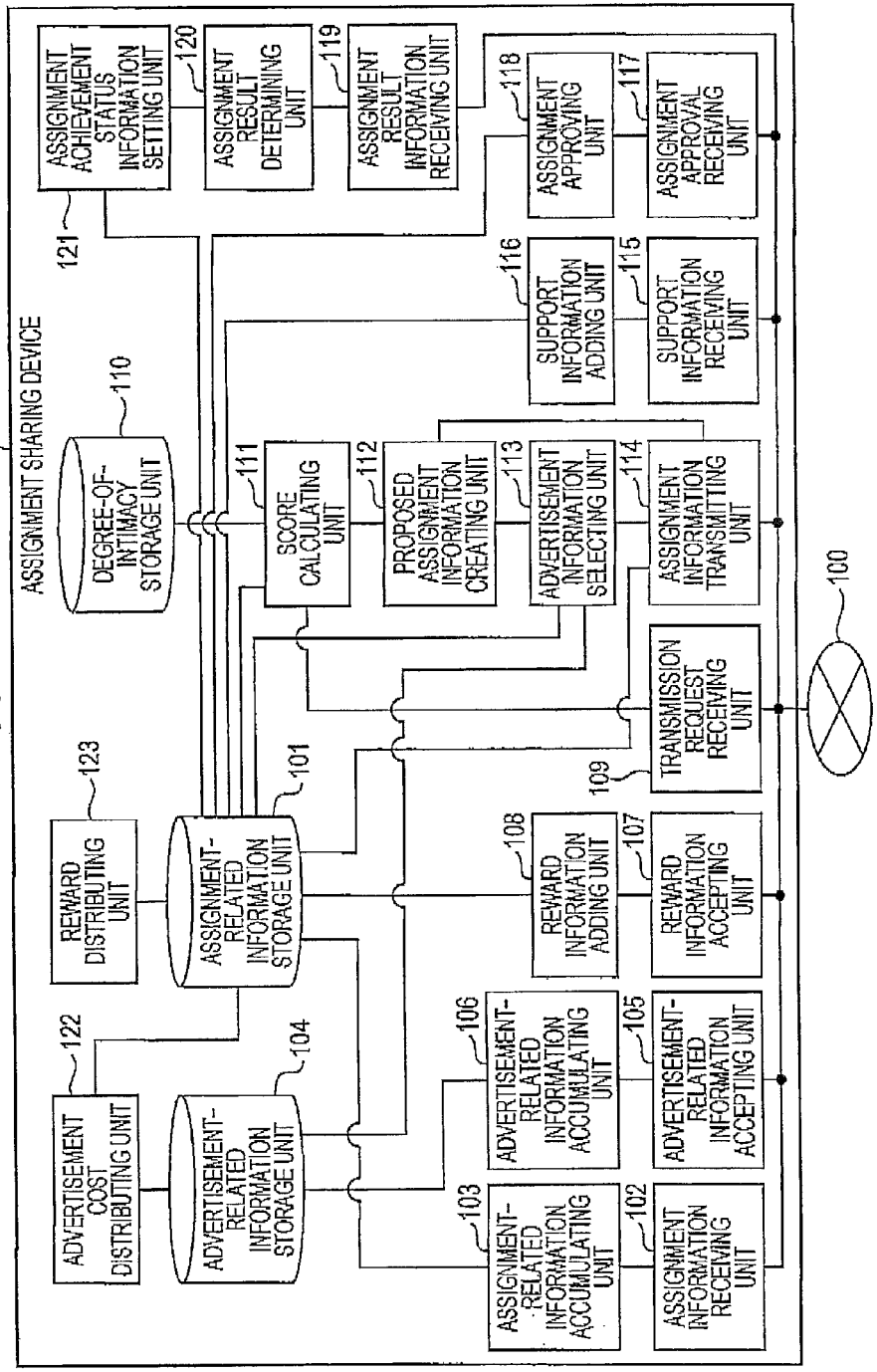
FIG. 2 is a block diagram of the assignment sharing device according to the embodiment.

FIG. 2 is a block diagram of the assignment sharing device 1 according to this embodiment. The assignment sharing device 1 includes an assignment-related information storage unit 101, an assignment information receiving unit 102, an assignment-related information accumulating unit 103, an advertisement-related information storage unit 104, an advertisement-related information accepting unit 105, an advertisement-related information accumulating unit 106, a reward information accepting unit 107, a reward information adding unit 108, a transmission request receiving unit 109, a degree-of-intimacy storage unit 110, a score calculating unit 111, a proposed assignment information creating unit 112, an advertisement information selecting unit 113, an assignment information transmitting unit 114, a support information receiving unit 115, a support information adding unit 116, an assignment approval receiving unit 117, an assignment approving unit 118, an assignment result information receiving unit 119, an assignment result determining unit 120, an assignment achievement status information setting unit 121, an advertisement cost distributing unit 122, and a reward distributing unit 123.

The assignment-related information storage unit 101 stores one or more pieces of assignment-related information. The assignment-related information includes assignment information, proposer identification information, challenger identification information, assignment approval information, and assignment achievement status information. The assignment-related information may further include one or more pieces of support information. The assignment-related information may further include reward information. The assignment-related information may further include advertisement identification information. The assignment-related information may further include assignment suitability. The assignment-related information may further include an assignment achievement condition.

The assignment information is information representing an assignment. The details of an assignment are not specified as long as the assignment includes information with which it can be determined whether or not the assignment has been achieved. The assignment information may be any information as long as it represents the details of the assignment. For example, the assignment information may be text information, audio information, still-image information, or moving-image information. The assignment information may be an ID or the like identifying assignment information stored in a storage unit (not illustrated) that manages assignment information. Specifically, the assignment information may be, for example, information representing "run 20 km" or "travel around all the prefectures".

The proposer identification information is information identifying a proposer of an assignment. The proposer identification information may be any information as long as it identifies a proposer. For example, the proposer identification information may be the name of a proposer, information regarding contact information, such as a telephone number or email address of a proposer, or an ID or the like identifying one or more of the above-described pieces of information.

The challenger identification information is information identifying a challenger of an assignment. The challenger identification information may be any information as long as it identifies a challenger. For example, the challenger identification information may be the name of a challenger, information regarding contact information, such as a telephone number or email address of a challenger, or an ID or the like identifying one or more of the above-described pieces of information.

The assignment approval information is information indicating whether or not a challenger has approved an assignment included in the assignment-related information including the assignment approval information. The assignment approval information may be any information as long as it identifies whether or not a challenger has approved an assignment represented by the assignment information included in the assignment-related information including the assignment approval information. For example, the assignment approval information may be information in which whether or not an assignment has been approved is identified by "1" or "0", "true" or "false", or a character string "approved" or "unapproved".

The assignment achievement status information is information representing an achievement status of an assignment represented by the assignment information included in the assignment-related information including the assignment achievement status information. The assignment achievement status information may be any information as long as it represents an achievement status of an assignment represented by the assignment information included in the assignment-related information including the assignment achievement status information. For example, the assignment achievement status information may be information in which an achievement status of an assignment is represented by "1" or "0", "true" or "false", or a character string "achieved" or "unachieved".

The support information is information regarding support from a third party, other than a proposer identified by the proposer identification information included in the assignment-related information including the support information, and a challenger identified by the challenger identification information included in the assignment-related information. The support information may be any information as long as it notifies the challenger included in the assignment-related information including the support information of the assignment represented by the assignment information included in the assignment-related information. For example, the support information may be a message of supporting the challenger, a message of encouraging the challenger, or a numeric value or the like regarding support, which is incremented through pressing of a support button or the like.

The reward information is information representing a reward for the assignment represented by the assignment information included in the assignment-related information including the reward information. The reward information may be any information as long as it represents a reward. For example, the reward information may be the amount to be paid when the assignment represented by the assignment information included in the assignment-related information including the reward information is achieved, or may be the point to be given when the assignment is achieved. The reward information may represent a reward to be given to a challenger, a reward to be given to a proposer, or rewards to be given to a challenger and a proposer. The reward information may include the amount to be paid to a party that operates the assignment sharing device 1. The reward information may be information representing the entire reward to be given, or may be information representing a part of the reward to be given. The information representing a part of the reward to be given may be, in a case where there are a plurality of people to which rewards are to be given, information representing the rewards to be given to the individual people, or information representing the rewards not including the amount to be paid to the party that operates the assignment sharing device 1.

The advertisement identification information is information identifying advertisement information. The advertisement identification information may be any information as long as it identifies advertisement information that is presented together with the assignment information included in the assignment-related information including the advertisement identification information. For example, the advertisement identification information may be advertisement information, or an ID or the like identifying advertisement information stored in a storage unit (not illustrated) that manages advertisement information. A description of the advertisement information will be given below. Also, a description of the details of an assignment achievement level will be given below.

The assignment suitability is a value indicating whether or not an assignment is suitable for a challenger. The assignment suitability may be information which represents "1" when the assignment is suitable and which represents "0" when the assignment is not suitable. Alternatively, the assignment suitability may be information the value of which increases as the suitability increases.

The assignment achievement condition is information that is used to determine whether or not an assignment represented by the assignment-related information included in the assignment-related information including the assignment achievement condition has been achieved. The assignment achievement condition may be any information as long as it serves as an indicator to determine whether or not the assignment represented by the assignment information included in the assignment-related information including the assignment achievement condition has been achieved. For example, the assignment achievement condition may be a threshold percentage at which it is determined that the assignment has been achieved, or may be information representing "transmit information indicating that the assignment has been achieved", or may be, in a case where the assignment is "run 20 km", information representing "travel 20 km or more at 6 km/h or more", or may be, in a case where the assignment is "travel around all the prefectures", information representing "transmit GPS coordinate logs of all the prefectures". A GPS coordinate log may be a GPS coordinate value representing one piece of current location information, or may be a set of sequential GPS coordinate values.

In the description given below, pieces of information included in the same assignment-related information may be referred to as pieces of information corresponding to one another. Specifically, proposer identification information included in assignment-related information including certain assignment information may be referred to as proposer identification information corresponding to the certain assignment information. Also, in the following description, individual pieces of information included in the assignment-related information stored in the assignment-related information storage unit 101 may be referred to as pieces of information stored in the assignment-related information storage unit 101. Specifically, assignment information included in the assignment-related information stored in the assignment-related information storage unit 101 may be referred to as assignment information stored in the assignment-related information storage unit 101. Individual pieces of information included in the assignment-related information may be stored in different tables and different recording media. In this case, the different tables and the different recording media may be regarded as the assignment-related information storage unit 101.

The assignment-related information storage unit 101 is preferably a nonvolatile recording medium, and may be a volatile recording medium. The assignment-related information storage unit 101 may temporarily store assignment-related information. For example, the assignment-related information storage unit 101 may temporarily store assignment-related information received from an external device or the like. For example, in the assignment-related information, assignment information, proposer identification information, challenger identification information, and an assignment achievement condition may be accumulated by the assignment-related information accumulating unit 103. Support information may be accumulated by the support information adding unit 116. Assignment approval information may be accumulated by the assignment approving unit 118. Assignment achievement status information may be accumulated by the assignment achievement status information setting unit 121. Reward information may be added by the reward information adding unit 108. Advertisement identification information may be accumulated by the advertisement information selecting unit 113. The manner in which assignment suitability is accumulated in the assignment-related information storage unit 101 is not specified. For example, assignment suitability may be accumulated in the assignment-related information storage unit 101 via a recording medium. Alternatively, a receiving unit (not illustrated) may receive assignment suitability transmitted via the network 100, and an accumulating unit (not illustrated) may accumulate the received assignment suitability in the assignment-related information storage unit 101. Alternatively, assignment suitability input via an input device may be accumulated in the assignment-related information storage unit 101.

The assignment information receiving unit 102 receives, from the proposer terminal device 2, assignment information, proposer identification information, and challenger identification information. The assignment information receiving unit 102 may receive the assignment information, the proposer identification information, and the challenger identification information in association with one another. Receiving the assignment information, the proposer identification information, and the challenger identification information in association with one another may be simultaneously receiving them, or may be separately receiving them including the same ID, or may be receiving them in order. The assignment information receiving unit 102 may receive an assignment achievement condition. The assignment information receiving unit 102 may also receive an assignment achievement condition in association with the foregoing information in the same manner as that described above. The assignment information receiving unit 102 is normally constituted by a wireless or wired communication unit.

The assignment-related information accumulating unit 103 accumulates, in the assignment-related information storage unit 101, the assignment information, proposer identification information, and challenger identification information received by the assignment information receiving unit 102 so that these pieces of information are included in a single piece of assignment-related information. In a case where the assignment information receiving unit 102 receives an assignment achievement condition, the assignment-related information accumulating unit 103 may accumulate, in the assignment-related information storage unit 101, the assignment information, proposer identification information, challenger identification information, and assignment achievement condition so that these pieces of information are included in a single piece of assignment-related information. The assignment-related information accumulating unit 103 may accumulate individual pieces of information at a time or separately. Normally, the assignment-related information accumulating unit 103 may be constituted by a microprocessing unit (MPU), a memory, and so forth. A processing procedure of the assignment-related information accumulating unit 103 is normally implemented by software, which is recorded on a recording medium such as a read only memory (ROM). Alternatively, the processing procedure may be implemented by hardware (a dedicated circuit).

The advertisement-related information storage unit 104 stores advertisement-related information. The advertisement-related information includes advertisement information and advertisement cost information. The advertisement information is information representing an advertisement that is transmitted together with assignment information. The advertisement cost information represents the advertisement cost of running an advertisement represented by the advertisement information included in the advertisement-related information including the advertisement cost information. The advertisement-related information may include an advertisement keyword, which includes one or more keywords related to an advertisement. The advertisement information may be any information as long as it represents an advertisement. For example, the advertisement information may be text information, audio information, still-image information, or moving-image information. The advertisement information may be an ID or the like identifying advertisement information stored in a storage unit (not illustrated) that manages advertisement information. The advertisement cost information may be any information as long as it represents the cost of running an advertisement. For example, the advertisement cost information may be the amount to be paid when the assignment in which the advertisement represented by the advertisement information included in the advertisement-related information including the advertisement cost information is run is achieved, or may be the point to be given when the assignment is achieved. Alternatively, the advertisement cost information may represent the advertisement cost to be paid to a challenger, the advertisement cost to be paid to a proposer, or the advertisement cost to be paid to a challenger and a proposer. Alternatively, the advertisement cost information may include the amount to be paid to the party that operates the assignment sharing device 1. The advertisement cost information may be information representing the total advertisement cost to be paid, or may be information representing a part of the advertisement cost to be paid. The part of the advertisement cost may be, in a case where there are a plurality of people to which the advertisement cost is to be paid, the amounts to be paid to the individual people, or the amounts not including the amount to be paid to the party that operates the assignment sharing device 1. The advertisement keyword may be any keyword as long as it is related to the advertisement. Specifically, in a case where the advertisement information is "running shoes", advertisement keywords may be "run, running, shoes".

In the following description, pieces of information included in the same advertisement-related information may be referred to as pieces of information corresponding to one another. Specifically, advertisement cost information included in advertisement-related information including certain advertisement information may be referred to as advertisement cost information corresponding to the certain advertisement information. Also, in the following description, individual pieces of information included in the advertisement-related information stored in the advertisement-related information storage unit 104 may be referred as information stored in the advertisement-related information storage unit 104. Specifically, advertisement information included in the advertisement-related information stored in the advertisement-related information storage unit 104 may be referred to as advertisement information stored in the advertisement-related information storage unit 104. The advertisement-related information storage unit 104 is preferably a nonvolatile recording medium, but may be a volatile recording medium. In the advertisement-related information storage unit 104, advertisement-related information is stored by the advertisement-related information accumulating unit 106.

The advertisement-related information accepting unit 105 accepts advertisement-related information. The advertisement-related information accepting unit 105 may accept advertisement-related information from the advertiser terminal device 5 via the network 100, or may accept advertisement-related information from an input unit. The input unit is not specified and may be, for example, a numerical keypad, a keyboard, a mouse, or a menu screen. The advertisement-related information accepting unit 105 may be constituted by a device driver of the input unit, such as a numerical keypad or a keyboard, or control software of a menu screen.

The advertisement-related information accumulating unit 106 accumulates the advertisement-related information accepted by the advertisement-related information accepting unit 105 in the advertisement-related information storage unit 104. The advertisement-related information accumulating unit 106 may accumulate advertisement information and advertisement cost information at a time or separately. Normally, the advertisement-related information accumulating unit 106 may be constituted by an MPU, a memory, and so forth. A processing procedure of the advertisement-related information accumulating unit 106 is normally implemented by software, which is recorded on a recording medium such as a ROM. Alternatively, the processing procedure may be implemented by hardware (a dedicated circuit).

The reward information accepting unit 107 accepts assignment-related identification information identifying the assignment-related information stored in the assignment-related information storage unit 101 and reward information in association with each other. The assignment-related identification information may be any information as long as it identifies assignment-related information. For example, the assignment-related identification information may be a part of information included in assignment-related information, or may be information identifying the part of information, for example, assignment identification information identifying assignment information, or may be an ID or the like identifying assignment-related information. The assignment identification information may be assignment information, assignment-related information including assignment information, information corresponding to assignment information and included in assignment-related information, or an ID or the like identifying assignment information. That is, assignment-related identification information and assignment identification information may be the same information. Preferably, assignment identification information is information that uniquely specifies assignment-related information.

Receiving reward information and assignment-related identification information in association with each other may be simultaneously receiving them, or may be separately receiving them including the same ID, or may be receiving them in order. The reward information accepting unit 107 may accept reward information and so forth from the sponsor terminal device 6 via the network 100, or may accept reward information and so forth from an input unit. The input unit is not specified and may be, for example, a numerical keypad, a keyboard, a mouse, or a menu screen. The reward information accepting unit 107 may be constituted by a device driver of the input unit, such as a numerical keypad or a keyboard, or control software of a menu screen.

The reward information adding unit 108 adds the reward information accepted by the reward information accepting unit 107 to the assignment-related information that is identified by the assignment-related identification information associated with the reward information and that is stored in the assignment-related information storage unit 101. Normally, the reward information adding unit 108 may be constituted by an MPU, a memory, and so forth. A processing procedure of the reward information adding unit 108 is normally implemented by software, which is recorded on a recording medium such as a ROM. Alternatively, the processing procedure may be implemented by hardware (a dedicated circuit).

The transmission request receiving unit 109 receives a transmission request for assignment information from the proposer terminal device 2, the challenger terminal device 3, the supporter terminal device 4, the advertiser terminal device 5, and the sponsor terminal device 6. The transmission request receiving unit 109 may receive, from each terminal device, a transmission request for at least a part of assignment information stored in the assignment-related information storage unit 101, may receive a transmission request for assignment information corresponding to specific challenger identification information, may receive a transmission request for assignment information corresponding to specific proposer identification information, may receive a transmission request for assignment information included in the assignment-relate information accumulated in the assignment-related information storage unit 101 most recently, or may receive a transmission request for all the assignments stored in the assignment-related information storage unit 101. Further, the transmission request receiving unit 109 may receive, from a specific person, a transmission request for assignment information corresponding to the challenger identification information identifying the specific person, may receive, from a specific person, a transmission request for assignment information corresponding to the proposer identification information identifying the specific person, may receive, from an unspecific person, a transmission request for assignment information corresponding to the challenger identification information identifying a specific person, or may receive, from an unspecific person, a transmission request for assignment information corresponding to the proposer identification information identifying a specific person. The transmission request receiving unit 109 is normally constituted by a wireless or wired communication unit.

The degree-of-intimacy storage unit 110 stores a degree of intimacy between a prospective proposer and a prospective challenger. The degree of intimacy is a value corresponding to a relationship. The relationship may be, for example, a relationship between lovers, respect, like, hate, and so forth. The degree of intimacy may be a value indicating the intimacy between two persons. The degree of intimacy may be set by one of the two persons or both of the two persons, may be set on the basis of the values set by both of the two persons, or may be a value that can be obtained or calculated from an interaction status in another service, such as a social networking service (SNS). The value that can be obtained or calculated from an interaction status in another SNS service may be the number of times the two persons contact each other, the period in which the two persons contact each other, or a value calculated by combining the above-described pieces of information. The degree-of-intimacy storage unit 110 is preferably a nonvolatile recording medium, or may be a volatile recording medium. The manner in which a degree of intimacy is accumulated in the degreeof-intimacy storage unit 110 is not specified. For example, a degree of intimacy obtained by an external device that calculates a degree of intimacy from a specific SNS may be accumulated, a degree of intimacy may be accumulated in the degree-of-intimacy storage unit 110 via a recording medium, a degree of intimacy transmitted via a communication line or the like may be accumulated in the degree-of-intimacy storage unit 110, or a degree of intimacy input via an input device may be accumulated in the degree-of-intimacy storage unit 110.

The score calculating unit 111 calculates, for the assignment-related information stored in the assignment-related information storage unit 101, a score which is a value representing the suitability of the assignment represented by the assignment information included in the assignment-related information for the challenger identified by the challenger identification information included in the assignment-related information. In a case where the transmission request receiving unit 109 receives a transmission request that is limited to a specific challenger or proposer, the score calculating unit 111 may specify the assignment-related information including the information identifying the specific challenger or proposer, and may calculate a score only for the specified assignment-related information. The score calculated by the score calculating unit 111 may be regarded as a score for assignment-related information, a score for assignment information included in the assignment-related information, or a score for the assignment represented by the assignment information. The score may be a numeric value. The score calculating unit 111 calculates a score using at least one of a degree of encouragement, proposer suitability, challenger suitability, a degree of intimacy, assignment suitability, and a degree of support. The score calculating unit 111 may calculate a score using score=F (a degree of encouragement, proposer suitability, challenger suitability, a degree of intimacy, assignment suitability, and a degree of support). The function F may be an increasing function in which the score increases in accordance with a degree of encouragement, proposer suitability, challenger suitability, a degree of intimacy, assignment suitability, and a degree of support. Specifically, the score calculating unit 111 may perform calculation using the following increasing functions.

Score=$w1$×(degree of encouragement)+$w2$ (proposer suitability)+$w3$×(challenger suitability)+$w4$×(degree of intimacy)+$w5$×(assignment suitability)+$w6$ (degree of support)

It is assumed that w1, w2, w3, w4, w5, and w6 are real numbers of 0 or more. Hereinafter, a description will be given of (1) a degree of encouragement, (2) proposer suitability, (3) challenger suitability, (4) a degree of intimacy, (5) assignment suitability, and (6) a degree of support.

(1) Degree of Encouragement

The score calculating unit 111 may calculate a degree of encouragement, which is a value corresponding to the assignment-related information that is stored in the assignment-related information storage unit 101 and that includes proposer identification information included in the assignment-related information for which a score is to be calculated and challenger identification information included in the assignment-related information. The degree of encouragement may be a value that increases as the number of times the proposer identified by the proposer identification information included in the assignment-related information for which a score is to be calculated makes a proposal to the challenger identified by the challenger identification information included in the assignment-related information increases, a value that increases as the number of times the challenger makes a proposal to the proposer increases, a value that increases as the number of times an assignment proposed by the proposer to the challenger is approved increases, a value that decreases as the number of times an assignment proposed by the proposer to the challenger is not approved increases, a value that increases as the number of times an assignment proposed by the proposer to the challenger is achieved increases, or may be a value that decreases as the number of times an assignment proposed by the proposer to the challenger is not achieved increases. When calculating a degree of encouragement, the score calculating unit 111 may use or not use the assignment-related information of a calculation target. That is, the score calculating unit 111 may count or not count the assignment-related information of the calculation target by one. For example, in a case where the proposer identified by the proposer identification information included in the assignment-related information of a score calculation target has previously made a proposal four times to the challenger identified by the challenger identification information included in the assignment-related information, the score calculating unit 111 may calculate a degree of encouragement "4". Alternatively, the score calculating unit 111 may obtain a degree of encouragement "1" using a correspondence table, which defines a degree of encouragement "1" for a case where the number of proposals that have been made is 0 to 5, and a degree of encouragement "2" for a case where the number of proposals that have been made is 6 to 10. The degree of encouragement increases as the number of interactions that have been previously performed for many assignments between a proposer and a challenger increases. A larger value of the degree of encouragement implies that the challenger is more accustomed to receive an assignment from the proposer. Thus, the degree of encouragement may serve as a value indicating whether or not the assignment is suitable for the challenger.

(2) Proposer Suitability

The score calculating unit 111 may calculate proposer suitability, which is a value corresponding to the assignment-related information that is stored in the assignment-related information storage unit 101 and that includes proposer identification information included in the assignment-related information for which a score is to be calculated. The proposer suitability may be a value that increases as the number of times the proposer identified by the proposer identification information included in the assignment-related information for which a score is to be calculated makes a proposal increases, a value that increases as the number of times an assignment proposed by the proposer is approved increases, a value that decreases as the number of times an assignment proposed by the proposer is not approved increases, a value that increases as the number of times an assignment proposed by the proposer is achieved increases, or may be a value that decreases as the number of times an assignment proposed by the proposer is not achieved increases. When calculating proposer suitability, the score calculating unit 111 may use or not use assignment-related information of a calculation target. That is, the score calculating unit 111 may count or not count the assignment-related information of the calculation target by one. For example, in a case where the proposer identified by the proposer identification information included in the assignment-related information for which a score is to be calculated has previously made a proposal twelve times, the score calculating unit 111 may calculate proposer suitability "12".

Alternatively, the score calculating unit 111 may obtain proposer suitability "2" using a correspondence table, which defines proposer suitability "1" for a case where the number of proposals that have been made is 0 to 10, and proposer suitability "2" for a case where the number of proposals that have been made is 10 to 30. The proposer suitability increases as the number of assignments that have previously been proposed by the proposer increases. A larger value of the proposer suitability implies that the proposer is more accustomed to propose an assignment. Thus, the proposer suitability may serve as a value indicating whether or not the assignment is suitable for the challenger.

(3) Challenger Suitability

The score calculating unit 111 may calculate challenger suitability, which is a value corresponding to the assignment-related information that is stored in the assignment-related information storage unit 101 and that includes challenger identification information included in the assignment-related information for which a score is to be calculated. The challenger suitability may be a value that increases as the number of times the challenger identified by the challenger identification information included in the assignment-related information for which a score is to be calculated has received a proposal increases, a value that increases as the number of times the challenger approves a proposed assignment increases, a value that decreases as the number of times the challenger does not approve a proposed assignment increases, a value that increases as the number of times the challenger achieves a proposed assignment increases, or may be a value that decreases as the number of times the challenger does not achieve a proposed assignment increases. When calculating challenger suitability, the score calculating unit 111 may use or not use the assignment-related information of a calculation target. That is, the score calculating unit 111 may count or not count the assignment-related information of the calculation target by one. For example, in a case where the challenger identified by the challenger identification information included in the assignment-related information for which a score is to be calculated has previously had a proposal fourteen times, the score calculating unit 111 may calculate challenger suitability "14". Alternatively, the score calculating unit 111 may obtain challenger suitability "2" using a correspondence table, which defines challenger suitability "1" for a case where the number of proposals that have been received is 0 to 10, and challenger suitability "2" for a case where the number of proposals that have been received is 10 to 30. The challenger suitability increases as the number of assignments that have previously been proposed to the challenger increases. A larger value of the challenger suitability implies that the challenger is more accustomed to receive an assignment. Thus, the challenger suitability may serve as a value indicating whether or not the assignment is suitable for the challenger.

(4) Degree of Intimacy

The score calculating unit 111 may calculate a degree of intimacy, which is a value corresponding to the relationship between a proposer identified by the proposer identification information included in the assignment-related information for which a score is to be calculated, and a challenger identified by the challenger identification information included in the assignment-related information for which the score is to be calculated. The score calculating unit 111 may obtain a degree of intimacy regarding the two persons stored in the degree-of-intimacy storage unit 110, may obtain a degree of intimacy from an external information management device (not illustrated) that manages degrees of intimacy via the network 100, or may obtain or calculate a degree of intimacy from an interaction state in a service such as another SNS via the network 100. For example, in a case where a degree of intimacy "5" is stored in the degree-of-intimacy storage unit 110 as the relationship between the proposer identified by the proposer identification information included in the assignment-related information for which a score is to be calculated and the challenger identified by the challenger identification information included in the assignment-related information, the score calculating unit 111 may obtain the degree of intimacy "5". In a case where a degree of intimacy "lovers" is stored in the degree-of-intimacy storage unit 110, the score calculating unit 111 may obtain a degree of intimacy "2" using a correspondence table, which defines a degree of intimacy "1" for "friends", and a degree of intimacy "2" for "lovers". The value of the degree of intimacy increases as the proposer and the challenger know each other more. As the proposer and the challenger know each other more, the proposer proposes an assignment by more considering the condition of the challenger. Thus, a degree of intimacy may serve as a value indicating whether or not the assignment is suitable for the challenger.

(5) Assignment Suitability

The score calculating unit 111 may obtain assignment suitability, which is a value corresponding to the relationship between a challenger identified by the challenger identification information included in the assignment-related information for which a score is to be calculated, and an assignment represented by the assignment information included in the assignment-related information. The assignment suitability may be set by the proposer identified by the proposer identification information included in the assignment-related information of a calculation target in consideration of the challenger, may be set by the challenger identified by the challenger identification information included in the assignment-related information in order to change display order of assignments in a case where the assignments are transmitted, may be set by the proposer and the challenger, or may be calculated on the basis of the values set by the proposer and the challenger. The assignment suitability may be a value that increases as the priority of the assignment increases in accordance with the health condition, status, aim, and so forth of the challenger, or may be a value that increases as the importance of the assignment included in the assignment-related information of a calculation target for the challenger increases. For example, in a case where the assignment suitability included in the assignment-related information of a calculation target is 5, the score calculating unit 111 may obtain assignment suitability "5". The assignment suitability increases as the necessity of the assignment to the challenger and the proposer increases. Thus, the assignment suitability may be a value that increases as the suitability of the assignment-related information for the challenger increases.

(6) Degree of Support

The score calculating unit 111 may obtain a degree of support using the support information included in the assignment-related information stored in the assignment-related information storage unit 101. In a case where the support information included in the assignment-related information of a calculation target includes messages, the degree of support may be the number of the messages. In a case where the support information is numeric information, the degree of support may be the value thereof. For example, in a case where the support information included in the assignment-related information of a calculation target includes two messages, the score calculating unit 111 may obtain a degree of support "2". The degree of support increases as the attention of a third party increases. Thus, the degree of support may be a value that increases as the suitability of the assignment-related information for the challenger increases.

The score calculating unit 111 may calculate a score at the timing of responding to a transmission request received by the transmission request receiving unit 109, or may calculate a score at a certain timing. The certain timing may be set by a user, a developer, or a manager. The certain timing may be, for example, once a day, or the timing at which a new assignment is accumulated in the assignment-related information storage unit 101. Normally, the score calculating unit 111 may be constituted by an MPU, a memory, and so forth. A processing procedure of the score calculating unit 111 is normally implemented by software, which is recorded on a recording medium such as a ROM. Alternatively, the processing procedure may be implemented by hardware (a dedicated circuit).

The proposed assignment information creating unit 112 specifies pieces of assignment-related information that are include in the assignment-related information stored in the assignment-related information storage unit 101 and that have the same challenger identification information, and creates, by using at least a part of the specified pieces of assignment-related information, proposed assignment information, which is assignment information representing an assignment to be proposed to a challenger in accordance with the score calculated by the score calculating unit 111. In a case where the score calculating unit 111 has already specified pieces of assignment-related information that have the same challenger identification information, the proposed assignment information creating unit 112 need not specify pieces of assignment-related information that have the same challenger identification information. The proposed assignment information creating unit 112 may create proposed assignment information using all the pieces of assignment information stored in the assignment-related information storage unit 101, or using some of the pieces of assignment-related information. The some of the pieces of assignment-related information may be some pieces of assignment-related information that have been accumulated most recently, or may be some pieces of assignment-related information that have been randomly selected. Also, the proposed assignment information creating unit 112 may create proposed assignment information by narrowing down assignment-related information in accordance with the score calculated by the score calculating unit 111, or may create proposed assignment information by rearranging pieces of assignment-related information in accordance with the score. Rearranging pieces of assignment-related information in accordance with the score may be rearranging pieces of assignment-related information so that a piece of assignment-related information having a higher score is prioritized. In a case where rearrangement is performed, it is preferable that two or more pieces assignment-related information having the same challenger identification information be stored in the assignment-related information storage unit 101. In the case of narrowing down assignment information, the proposed assignment information creating unit 112 need not include assignment information included in the assignment-related information corresponding to a score lower than a predetermined threshold in proposed assignment information. The threshold may be a value obtained by multiplying an average value of all the scores of pieces of assignment-related information having the same challenger identification information by a value of one or less, or may be a predetermined value. The predetermined value may be a value set by a developer, or may be a value set by a challenger or the like. The proposed assignment information creating unit 112 may determine, for each piece of assignment information, whether or not the piece of assignment information is to be transmitted. Normally, the proposed assignment information creating unit 112 may be constituted by an MPU, a memory, and so forth. A processing procedure of the proposed assignment information creating unit 112 is normally implemented by software, which is recorded on a recording medium such as a ROM. Alternatively, the processing procedure may be implemented by hardware (a dedicated circuit).

The advertisement information selecting unit 113 selects, from among pieces of advertisement information included in the advertisement-related information stored in the advertisement-related information storage unit 104, a piece of advertisement information related to assignment information included in assignment-related information. The assignment information for which the advertisement information selecting unit 113 selects an advertisement may be the assignment-related information stored in the assignment-related information storage unit 101. The advertisement information selecting unit 113 may select advertisement information related to the assignment information included in the proposed assignment information created by the proposed assignment information creating unit 112. The advertisement information selecting unit 113 may select an advertisement suitable for the assignment information on the basis of a term included in the assignment information, or may select an advertisement suitable for the challenger identified by the challenger identification information corresponding to the assignment information. In a case where the assignment information stored in the assignment-related information storage unit 101 is a character string or is associated with a character string, and where an advertisement suitable for the assignment information is to be selected in accordance with a term included in the assignment information, the advertisement information selecting unit 113 may obtain an advertisement keyword stored in the advertisement-related information storage unit 104, and, if the term included in the assignment information matches the advertisement keyword, the advertisement information selecting unit 113 may select the advertisement information for the assignment information. In the case of selecting an advertisement suitable for a challenger, if the advertisement information previously selected by the challenger is stored in a storage unit (not illustrated) or an external storage device, the advertisement information selecting unit 113 may select advertisement information that may be easily selected by the challenger, in accordance with the previous selection state of the challenger. Regarding selection of advertisement information, various selection methods including the one described above have been suggested in the related art, and thus a description of the details thereof is omitted. The advertisement information selecting unit 113 may select advertisement information using any of these methods.

In a case where certain advertisement information related to certain assignment information has been selected, the advertisement information selecting unit 113 may add advertisement identification information identifying the advertisement to the assignment-related information including the assignment information, or may accumulate the advertisement identification information identifying the advertisement and the assignment identification information identifying the assignment information in a storage unit (not illustrated) in association with each other. Normally, the advertisement information selecting unit 113 may be constituted by an MPU, a memory, and so forth. A processing procedure of the advertisement information selecting unit 113 is normally implemented by software, which is recorded on a recording medium such as a ROM. Alternatively, the processing procedure may be implemented by hardware (a dedicated circuit).

The assignment information transmitting unit 114 transmits assignment information included in assignment-related information to the challenger terminal device 3 of the challenger who is identified by the challenger identification information included in the assignment-related information stored in the assignment-related information storage unit 101. The assignment information transmitting unit 114 may transmit, in response to a transmission request received by the transmission request receiving unit 109, assignment information to the terminal device that has transmitted the transmission request, or may transmit, to the challenger identified by the challenger identification information included in the assignment information stored in the assignment-related information storage unit 101, the assignment information corresponding to the challenger identification information at a predetermined time interval. In a case where assignment information is transmitted at a predetermined time interval, if challenger identification information and information such as an email address for contacting the challenger identified by the challenger identification information are stored in a storage unit (not illustrated), the assignment information transmitting unit 114 may transmit the assignment information using the information. The assignment information transmitted by the assignment information transmitting unit 114 may be proposed assignment information created by the proposed assignment information creating unit 112.

Also, the assignment information transmitting unit 114 may transmit assignment information included in assignment-related information also to a third party. The assignment information transmitted by the assignment information transmitting unit 114 to the third party may be assignment information included in the assignment-related information stored in the assignment-related information storage unit 101. The assignment information transmitting unit 114 may transmit at least a part of the assignment information stored in the assignment-related information storage unit 101 to the third party. The part of the assignment information may be assignment information that has been accumulated most recently, or may be selected pieces of assignment information whose accumulation date is close to the current time. Also, the assignment information transmitting unit 114 may transmit assignment information and corresponding proposer identification information in association with each other, may transmit assignment information and corresponding challenger identification information in association with each other, may transmit assignment information and corresponding support information in association with each other, may transmit assignment information and other information included in the assignment-related information including the assignment information in association with each other, or may transmit assignment information and assignment identification information in association with each other. The proposer identification information and challenger identification information transmitted at this time may be the names of the proposer and challenger. The assignment information transmitting unit 114 may transmit assignment information and advertisement information selected by the advertisement information selecting unit 113 in association with each other. The assignment information transmitting unit 114 is normally constituted by a wireless or wired communication unit, or may be constituted by a broadcasting unit.

The support information receiving unit 115 receives, from a terminal device of a third party, support information and assignment identification information identifying the assignment information representing the assignment supported by the third party using the support information, in association with each other. The support information receiving unit 115 may simultaneously receive the support information and the assignment identification information, or may receive the support information and the assignment identification information in association with each other by causing the support information and the assignment identification information to include the same ID. The terminal device of the third party that transmits support information may be the supporter terminal device 4. The support information receiving unit 115 is normally constituted by a wireless or wired communication unit.

The support information adding unit 116 adds support information received by the support information receiving unit 115 to the assignment-related information including the assignment information identified by the assignment identification information associated with the support information. Normally, the support information adding unit 116 may be constituted by an MPU, a memory, and so forth. A processing procedure of the support information adding unit 116 is normally implemented by software, which is recorded on a recording medium such as a ROM. Alternatively, the processing procedure may be implemented by hardware (a dedicated circuit).

The assignment approval receiving unit 117 receives, from the challenger terminal device 2, assignment identification information identifying the assignment information representing an assignment approved by the challenger. The assignment identification information received by the assignment approval receiving unit 117 is assignment identification information identifying the assignment information representing the assignment that has been approved by the challenger among the assignments represented by the assignment information transmitted by the assignment information transmitting unit 114. The assignment approved by the challenger is an assignment that the challenger has decided to execute. The assignment approval receiving unit 117 may receive assignment identification information and assignment approval information in association with each other. Receiving the assignment identification information and the assignment approval information in association with each other may be simultaneously receiving the assignment identification information and the assignment approval information, may be separately receiving the assignment identification information and the assignment approval information including the same ID, or may be receiving the assignment identification information and the assignment approval information in order. Also, the assignment approval receiving unit 117 may receive support information via the network 100. The assignment approval receiving unit 117 is normally constituted by a wireless or wired communication unit.

The assignment approving unit 118 sets assignment approval information included in the assignment-related information including the assignment information identified by the assignment identification information received by the assignment approval receiving unit 117. The assignment approval information set by the assignment approving unit 118 is included in the assignment-related information stored in the assignment-related information storage unit 101. Setting assignment approval information may be setting a value indicating that an assignment has been approved to the assignment approval information. In a case where the assignment approval receiving unit 117 receives assignment identification information and assignment approval information in association with each other, the assignment approving unit 118 may set the received assignment approval information to the assignment approval information corresponding to the assignment information identified by the assignment identification information. Normally, the assignment approving unit 118 may be constituted by an MPU, a memory, and so forth. A processing procedure of the assignment approving unit 118 is normally implemented by software, which is recorded on a recording medium such as a ROM. Alternatively, the processing procedure may be implemented by hardware (a dedicated circuit).

The assignment result information receiving unit 119 receives, from the challenger terminal device 3, assignment result information, which is included in assignment-related information together with challenger identification information identifying the challenger and which is information regarding an execution result of the assignment represented by the assignment information corresponding to the assignment approval information set by the assignment approving unit 118. The assignment result information may include or not include assignment identification information identifying the assignment information representing the assignment corresponding to the result represented by the assignment result information. In a case where the assignment result information does not include assignment identification information, the challenger may always be allowed to approve only one assignment or less. In order to realize "always be allowed to approve only one assignment or less", the assignment information receiving unit 102 does not receive a new assignment for the challenger identified by the challenger identification information corresponding to assignment achievement status information in which information representing "unachieved" is set. Alternatively, if there is a piece of assignment approval information having a value indicating that an assignment has been approved among pieces of assignment-related information having the same challenger identification information, the assignment approval receiving unit 117 does not receive the assignment identification information identifying the assignment information corresponding to the challenger identification information. The assignment result information receiving unit 119 does not necessarily receive information regarding a result of execution of the assignment represented by the assignment information included in the assignment-related information having assignment approval information in which a value indicating that an assignment has been achieved is not set. That is, in a case where assignment result information has been transmitted, the assignment result information receiving unit 119 receives the assignment result information if the assignment identified by the assignment identification information included in the assignment result information has been approved by the challenger, and does not receive the assignment result information if the assignment has not been approved. After detecting the assignment result information, the assignment result information receiving unit 119 may specify the assignment information stored in the assignment-related information storage unit 101 using the assignment identification information included in the assignment result information, may refer to the assignment approval information corresponding to the assignment information, and, if the assignment approval information is set to a value indicating that the assignment has been approved, may eventually receive the assignment result information. In this case, detection means the first reception performed by the assignment result information receiving unit 119. The assignment result information receiving unit 119 detects transmitted assignment result information to determine whether or not it is the information to be finally received. If the assignment result information represents an assignment result regarding an approved assignment, the assignment result information receiving unit 119 finally receives the information. If the assignment approval information is not set to a value indicating that the assignment has been approved, the assignment result information receiving unit 119 may discard the detected assignment result information, and need not process the detected assignment result information.

The assignment result information may be, for example, binary information indicating whether or not the assignment has been achieved, or may be information representing an achievement percentage indicating an assignment achievement status. In this embodiment, it is assumed that the assignment result information is information regarding an activity performed in an assignment. The information regarding an activity performed in an assignment may be a GPS coordinate log obtained by a challenger terminal as a result of executing an assignment regarding running, may be the answer of a test obtained as a result of executing an assignment regarding academic improvement in the challenger terminal, or may be any information among pieces of information collected by the challenger terminal device 3 during execution of an assignment, as long as whether the assignment has been achieved or not has been achieved can be determined using the information. Normally, the assignment result information receiving unit 119 may be constituted by a wireless or wired communication unit.

The assignment result determining unit 120 may determine whether or not the assignment regarding the assignment result information received by the assignment result information receiving unit 119 has been achieved, using the assignment result information. In a case where the assignment result information includes assignment identification information, the assignment result determining unit 120 may perform determination for the assignment represented by the assignment information identified by the assignment identification information. For example, in a case where the assignment represented by the assignment information identified by the assignment identification information included in the assignment result information is "run 20 km" and the achievement condition of the assignment is "travel 20 km or more at 6 km/h or more", and where the assignment result information is a GPS coordinate log obtained by the terminal of the challenger, The assignment result determining unit 120 may determine that the assignment has been achieved if the GPS coordinate log indicates that the challenger has traveled 20 km or more and the traveling speed is constantly 6 km/h or more. The assignment result determining unit 120 may obtain an achievement condition of an assignment from the assignment-related information storage unit 101 or from a storage unit (not illustrated). Normally, the assignment result determining unit 120 may be constituted by an MPU, a memory, and so forth. A processing procedure of the assignment result determining unit 120 is normally implemented by software, which is recorded on a recording medium such as a ROM. Alternatively, the processing procedure may be implemented by hardware (a dedicated circuit).

The assignment achievement status information setting unit 121 sets information representing a result determined by the assignment result determining unit 120 to the assignment achievement status information included in the assignment-related information including assignment information regarding the assignment result information received by the assignment result information receiving unit 119. "Assignment information regarding the assignment result information" may be assignment information identified by assignment identification information included in the assignment result information if the assignment identification information is included in the assignment result information, and may be, if only one assignment is approved by each challenger, assignment information representing the approved assignment. The assignment achievement status information setting unit 121 may set, in accordance with the assignment result information received by the assignment result information receiving unit 119, assignment achievement status information included in assignment-related information including assignment information representing an assignment regarding the assignment result information. In this embodiment, the assignment achievement status information setting unit 121 sets information about the result determined by the assignment result determining unit 120. In a case where the assignment result information includes assignment identification information, "an assignment regarding the assignment result information" may be the assignment represented by the assignment information indicated by the assignment identification information included in the assignment result information. In a case where only one assignment is approved by each challenger, "an assignment regarding the assignment result information" may be the assignment. The assignment achievement status information setting unit 121 sets the assignment achievement status information corresponding to the assignment information identified by the assignment identification information included in the assignment result information received by the assignment result information receiving unit 119. Normally, the assignment achievement status information setting unit 121 may be constituted by an MPU, a memory, and so forth. A processing procedure of the assignment achievement status information setting unit 121 is normally implemented by software, which is recorded on a recording medium such as a ROM. Alternatively, the processing procedure may be implemented by hardware (a dedicated circuit).

The advertisement cost distributing unit 122 distributes, in accordance with the assignment achievement status information set by the assignment achievement status information setting unit 121, at least a part of the advertisement cost represented by the advertisement cost information included in the advertisement-related information including the advertisement information selected by the advertisement information selecting unit 113 for the assignment-related information, to the challenger identified by the challenger identification information included in the assignment-related information including the assignment achievement status information. In accordance with the assignment achievement status information set by the assignment achievement status information setting unit 121, the advertisement cost distributing unit 122 may distribute at least a part of the advertisement cost represented by the advertisement cost information also to the proposer identified by the proposer identification information included in the assignment-related information including the assignment achievement status information. Distributing the advertisement cost in accordance with the assignment achievement status information may be distributing the advertisement cost in a case where an assignment has been completely achieved, or may be distributing more advertisement cost as the assignment achievement status is more approximate to the completion. The advertisement cost distributing unit 122 may distribute the advertisement cost to the challenger and the proposer so that the amounts received thereby are equal to each other, or so that the amounts are different from each other. Distributing at least a part of the advertisement cost may be distributing, by the advertisement cost distributing unit 122, advertisement cost resulting from subtracting a commission or the like from the advertisement cost represented by the advertisement cost information stored in the advertisement-related information storage unit 104, or may be distributing, by the advertisement cost distributing unit 122, a predetermined amount or point obtained from the advertisement cost. The predetermined amount or point may be, in a case where the advertisement cost represented by the advertisement cost information is the total budget for running the advertisement represented by the advertisement information corresponding to the advertisement cost information, the maximum amount to be distributed for each assignment, or the maximum amount to be distributed for each person.

The distribution may be transmission of at least a part of advertisement cost to an account number of a challenger or the like stored in a storage unit (not illustrated) by using a transfer device operated by a bank (not illustrated), may be notification of a challenger and at least a part of advertisement cost using an email or the like to a person in accounting, or may be issue of a form in which a challenger and at least a part of advertisement cost are recorded. Alternatively, the distribution may be output of a challenger and at least a part of advertisement cost. The concept of output includes display on a display, projection using a projector, printing using a printer, transmission to an external device, accumulation in a recording medium, and transfer of a processing result to another processing device or another program. Normally, the advertisement cost distributing unit 122 may be constituted by an MPU, a memory, and so forth. A processing procedure of the advertisement cost distributing unit 122 is normally implemented by software, which is recorded on a recording medium such as a ROM. Alternatively, the processing procedure may be implemented by hardware (a dedicated circuit).

The reward distributing unit 123 distributes, in accordance with the assignment achievement status information set by the assignment achievement status information setting unit 121, at least a part of reward represented by reward information included in assignment-related information to the challenger identified by the challenger identification information included in the assignment-related information including the assignment achievement status information. The reward distributing unit 123 may distribute at least a part of the reward represented by the reward information also to the proposer identified by the proposer identification information included in the assignment-related information including the assignment achievement status information in accordance with the assignment achievement status information set by the assignment achievement status information setting unit 121. Distributing reward in accordance with the assignment achievement status information may be distributing reward in a case where an assignment has been completely achieved, or may be distributing more reward as the assignment achievement status is more approximate to the completion. The reward distributing unit 123 may distribute reward to the challenger and the proposer so that the amounts received thereby are equal to each other, or so that the amounts are different from each other. Distributing at least a part of reward may be distributing, by the reward distributing unit 123, reward resulting from subtracting a commission or the like from the reward represented by the reward information stored in the assignment-related information storage unit 101, or may be distributing, by the reward distributing unit 123, a predetermined amount or point obtained from the reward. The predetermined amount or point may be, in a case where the reward represented by the reward information is the total budget, the maximum amount to be distributed for each assignment, or the maximum amount to be distributed for each person.

The distribution may be transmission of at least a part of reward to an account number of a challenger or the like stored in a storage unit (not illustrated) by using a transfer device operated by a bank (not illustrated), may be notification of a challenger and at least a part of reward using an email or the like to a person in accounting, or may be issue of a form in which a challenger and at least a part of reward are recorded. Alternatively, the distribution may be output of a challenger at least a part of reward. Normally, the reward distributing unit 123 may be constituted by an MPU, a memory, and so forth. A processing procedure of the reward distributing unit 123 is normally implemented by software, which is recorded on a recording medium such as a ROM. Alternatively, the processing procedure may be implemented by hardware (a dedicated circuit).

Figure 3B:
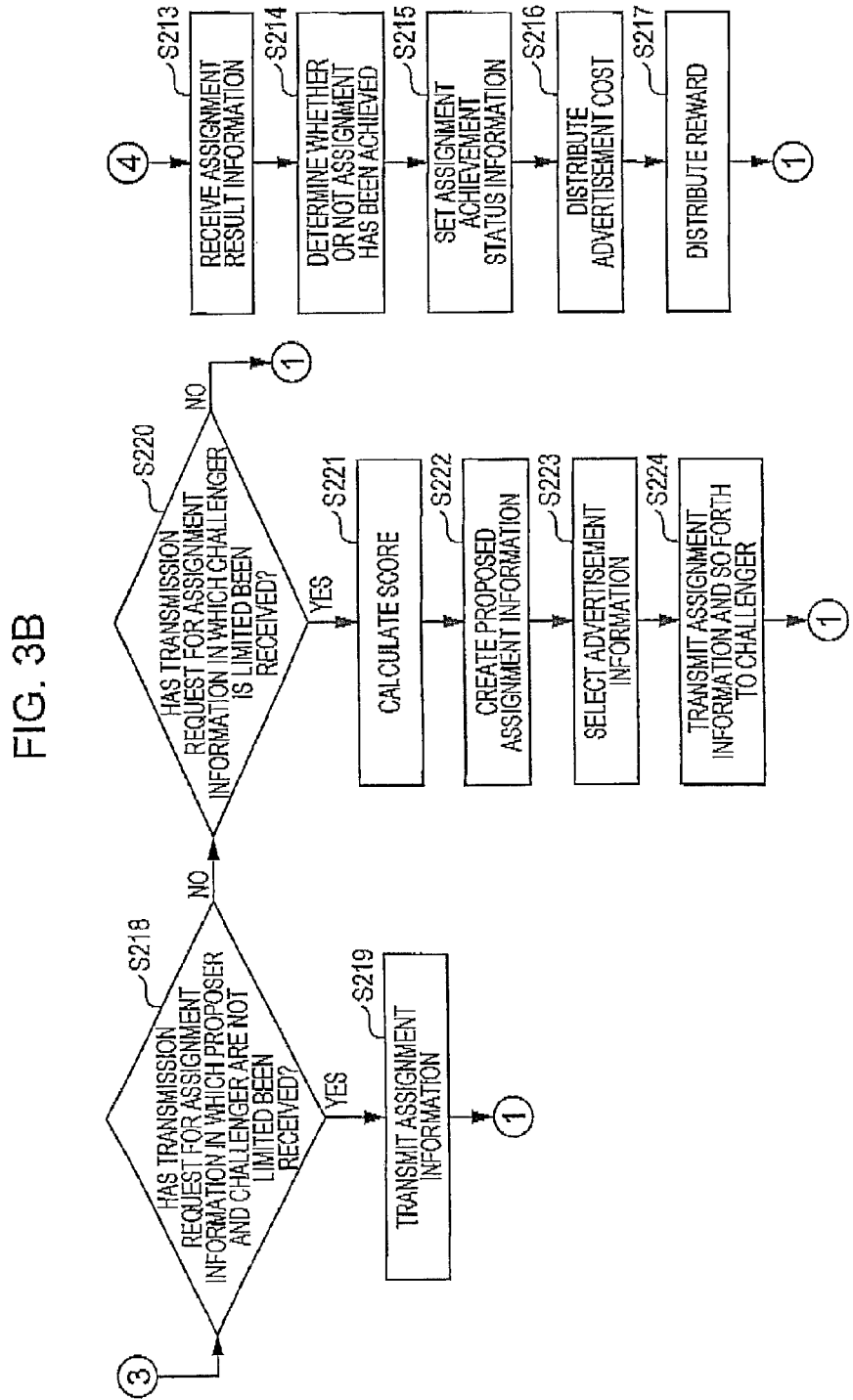

FIGS. 3A and 3B are flowcharts illustrating an example of the operation of the assignment sharing device 1 according to this embodiment. Hereinafter, the operation will be described with reference to FIGS. 3A and 3B.

In step S201, the assignment information receiving unit 102 determines whether or not assignment information and so forth have been received. If assignment information and so forth have been received, the process proceeds to step S202. If assignment information and so forth have not been received, the process proceeds to step S203.

In step S202, the assignment-related information accumulating unit 103 accumulates the assignment information and so forth received in step S201 in the assignment-related information storage unit 101. Subsequently, the process returns to step S201.

In step S203, the advertisement-related information accepting unit 105 determines whether or not advertisement-related information has been accepted. If advertisement-related information has been accepted, the process proceeds to step S204. If advertisement-related information has not been accepted, the process proceeds to step S205.

In step S204, the advertisement-related information accumulating unit 100 accumulates the advertisement-related information accepted in step S203 in the advertisement-related information storage unit 104. Subsequently, the process returns to step S201.

In step S205, the reward information accepting unit 107 determines whether or not reward information has been accepted. If reward information has been accepted, the process proceeds to step S206. If reward information has not been accepted, the process proceeds to step S207.

In step S206, the reward information adding unit 108 adds the reward information accepted in step S205 to the assignment-related information stored in the assignment-related information storage unit 101. Subsequently, the process returns to step S201.

In step S207, the support information receiving unit 115 determines whether or not support information has been received. If support information has been received, the process proceeds to step S208. If support information has not been received, the process proceeds to step S209.

In step S208, the support information adding unit 116 adds the support information received in step S207 to the assignment-related information corresponding to the support information. Subsequently, the process returns to step S201.

In step S209, the assignment approval receiving unit 117 determines whether or not assignment identification information on an assignment to be approved has been received. If assignment identification information has been received, the process proceeds to step S210. If assignment identification information has not been received, the process proceeds to step S211.

In step S210, the assignment approving unit 118 sets the assignment approval information corresponding to the assignment information identified by the assignment identification information received in step S209 to a value indicating that the assignment has been approved. Subsequently, the process returns to step S201.

In step S211, the assignment result information receiving unit 119 determines whether or not assignment result information has been detected. If assignment result information has been detected, the process proceeds to step S212. If assignment result information has not been detected, the process proceeds to step S218.

In step S212, the assignment result information receiving unit 119 determines whether or not the assignment approval information corresponding to the assignment information identified by the assignment identification information included in the assignment result information detected in step S211 is set to the value indicating that the assignment has been approved. If the assignment approval information is set to the value indicating that the assignment has been approved, the process proceeds to step S213. If the assignment approval information is not set to the value indicating that the assignment has been approved, the process proceeds to step S218.

In step S213, the assignment result information receiving unit 119 receives the assignment result information detected in step S211.

In step S214, the assignment result determining unit 120 determines whether or not the assignment result information received in step S213 indicates that the assignment represented by the assignment information identified by the assignment identification information included in the assignment result information has been achieved.

In step S215, the assignment achievement status information setting unit 121 sets the result determined in step S214 to the assignment achievement status information corresponding to the assignment information identified by the assignment identification information included in the assignment result information received in step S213.

In step S216, the advertisement cost distributing unit 122 distributes, in accordance with the value set to the assignment achievement status information in step S215, a part of advertisement cost corresponding to the advertisement information identified by the advertisement identification information corresponding to the assignment achievement status information to a challenger. If the value set to the assignment achievement status information in step S215 represents unachieved, the part of advertisement cost need not be distributed. In this case, not distributing the advertisement cost may be distributing zero yen or zero points.

In step S217, the reward distributing unit 123 distributes, in accordance with the value set to the assignment achievement status information in step S215, a part of reward represented by the reward information corresponding to the assignment achievement status information to a challenger. Subsequently, the process returns to step S201. If the value set to the assignment achievement status information in step S215 represents unachieved, the part of reward need not be distributed. In this case, not distributing the reward may be distributing zero yen or zero points.

In step S218, the transmission request receiving unit 109 determines whether or not a transmission request for assignment information in which a proposer and a challenger are not limited has been received. If a transmission request for assignment information in which a proposer and a challenger are not limited has been received, the process proceeds to step S219. If the transmission request has not been received, the process proceeds to step S220.

In step S219, the assignment information transmitting unit 114 transmits the assignment information stored in the assignment-related information storage unit 101 to the terminal device that has transmitted the transmission request for the assignment information received in step S218. Subsequently, the process returns to step S201.

In step S220, the transmission request receiving unit 109 determines whether or not a transmission request for assignment information in which a challenger is limited has been received. If a transmission request for assignment information in which a challenger is limited has been received, the process proceeds to step S221. If the transmission request has not been received, the process returns to step S201.

In step S221, the score calculating unit 111 calculates the score of each piece of assignment-related information corresponding to the transmission request in which a challenger is limited and which has been received in step S220.

In step S222, the proposed assignment information creating unit 112 creates proposed assignment information in accordance with the score calculated in step S221.

In step S223, the advertisement information selecting unit 113 selects advertisement information related to each piece of assignment information included in the proposed assignment information created in step S222, and sets the advertisement identification information identifying the selected advertisement information to the advertisement information identification information that is stored in the assignment-related information storage unit 101 and that corresponds to the assignment information related to the advertisement information.

In step S224, the assignment information transmitting unit 114 transmits, to the terminal device that has transmitted the transmission request received in step S220, the proposed assignment information created in step S222 in association with the advertisement information selected in step S223. Subsequently, the process returns to step S201.

In the flowcharts illustrated in FIGS. 3A and 3B, the process is finished by power-off or interruption for finishing the process.

Hereinafter, a specific operation of the assignment sharing device 1 according to this embodiment will be described. The information illustrated in each figure in this specific example is prepared for convenience of description, and does not represent actual data. Also, according to the description of this specific example, steps S201, S203, S205, S207, S209, S211, S218, and S220 are performed in parallel, but actually these steps are performed in order. That is, if there is a description "assignment-related information has been received (step S203)", the preceding step of determining whether or not assignment information has been received (step S201) has been performed, but the description thereof is omitted. Also, in this specific example, it is assumed that the amount represented by advertisement cost information and reward information is the amount to be paid to a challenger when an assignment has been achieved. Also, in this specific example, it is assumed that the proposed assignment information creating unit 112 creates proposed assignment information so that an assignment in assignment-related information in which the score is five or less is not proposed. Also, in this specific example, it is assumed that there is a user information storage unit (not illustrated) in which challenger identification information and a bank account are associated with each other.

In this specific example, it is assumed that the degree-of-intimacy storage unit 110 stores the table illustrated in FIG. 4. The table illustrated in FIG. 4 shows the degrees of intimacy between certain users and users other than the certain users. For example, in the record of user A "user 1" and user B "user 2", a degree of intimacy "2" is registered. This indicates that the degree of intimacy between "user 1" and "user 2" is 2. Hereinafter, information identifying a proposer and a challenger, such as "user 1" and "user 2", may represent the user.

It is assumed that the proposer identified by proposer identification information "user 10" turns on the power of the proposer terminal device 2, which is the proposer's terminal device, and accesses the assignment sharing device 1. Also, it is assumed that the proposer opens a screen for transmitting an assignment and transmits assignment information "run 20 km", proposer identification information "user 10", challenger identification information "user 21", an achievement condition of the assignment "travel 20 km or more at 6 km/h or more", and assignment suitability "5" to the assignment sharing device 1 via the network 100. The assignment information receiving unit 102 receives the transmitted assignment information "run 20 km" and so forth (step S201). Subsequently, the assignment-related information accumulating unit 103 accumulates the received assignment information "run 20 km" and so forth in the assignment-related information storage unit 101 so that these pieces of information are regarded as a single piece of assignment-related information (step S202). The assignment-related information accumulated at this time is associated with a unique assignment ID "101". Further, each piece of information included in the assignment-related information accumulated at this time is set to an initial value, for example, "not set" for assignment approval information, "unachieved" for assignment achievement status information, "-" for support information, "-" for reward information, and "-" for advertisement identification information. It is assumed that four pieces of assignment information and so forth are further received in a similar manner, and are accumulated in association with an assignment ID "102", an assignment ID "103", an assignment ID "104", and an assignment ID "105". Accordingly, the assignment-related information stored in the assignment-related information storage unit 101 includes the assignment IDs, assignment information, challenger identification information, and proposer identification information illustrated in FIG. 5. Hereinafter, an assignment ID may be used as assignment identification information and assignment-related identification information.

It is assumed that an advertiser turns on the power of the advertiser terminal device 5, which is the advertiser's terminal device, and accesses the assignment sharing device 1. Also, it is assumed that the advertiser opens a screen for transmitting an advertisement, and transmits advertisement-related information to the assignment sharing device 1 via the network 100. The advertisement-related information includes advertisement information "ultimate solution for English learning! Learning from native English speaker (http://eng.sample)", advertisement keywords "English, English conversation", and advertisement cost information "10 yen". The advertisement-related information accepting unit 105 receives the transmitted advertisement-related information (step S203). The advertisement-related information accumulating unit 106 accumulates the received advertisement-related information in the advertisement-related information storage unit 104 (step S204). The advertisement-related information accumulated at this time is associated with a unique advertisement ID "201". It is assumed that three pieces of advertisement-related information are further received in a similar manner and are accumulated in association with an advertisement ID "202", an advertisement ID "203", and an advertisement ID "204". Accordingly, the advertisement-related information illustrated in FIG. 6 is stored in the advertisement-related information storage unit 104. Hereinafter, an advertisement ID may be used as advertisement-related identification information.

It is assumed that a sponsor turns on the power of the sponsor terminal device 6, which is the sponsor's terminal device, and accesses the assignment sharing device 1. Also, it is assumed that the sponsor opens a screen for transmitting a transmission request for selecting an assignment to be sponsored, and transmits a transmission request for assignment information in which a proposer and a challenger are not limited to the assignment sharing device 1 via the network 100. The transmission request receiving unit 109 receives the transmission request (step S218). The assignment information transmitting unit 114 transmits, to the sponsor terminal device 6, five pieces of assignment information stored in the assignment-related information storage unit 101 in association with the corresponding pieces of assignment identification information (step S219). Accordingly, the reward information illustrated in FIG. 5 is obtained.

It is assumed that, upon receiving the pieces of assignment information from the assignment sharing device 1, the sponsor selects an assignment ID "101" from among them, and transmits it in association with reward information "100 yen". The reward information accepting unit 107 receives the transmitted reward information and so forth (step S205). The reward information adding unit 108 adds the received reward information "100 yen" to the reward information of the assignment ID "101" identified by the corresponding assignment-related identification information (step S206). It is assumed that reward information for the assignment ID "105" is further received in a similar manner and is accumulated.

It is assumed that a supporter turns on the power of the supporter terminal device 4, which is the supporter's terminal device, and accesses the assignment sharing device 1. Also, it is assumed that the supporter opens a screen for transmitting a transmission request for inputting support information, and transmits a transmission request for assignment information in which a proposer and a challenger are not limited to the assignment sharing device 1 via the network 100. The transmission request receiving unit 109 receives the transmission request (step S218). The assignment information transmitting unit 114 transmits, to the supporter's terminal device 4, the five pieces of assignment information stored in the assignment-related information storage unit 101 in association with the corresponding assignment identification information (step S219). Accordingly, the screen illustrated in FIG. 7 is displayed on the supporter terminal device 4.

It is assumed that the supporter operates the supporter terminal device 4, inputs "you can do it" to the text box of "run 20 km", and presses a "comment" button. Accordingly, the supporter terminal device 4 transmits the assignment identification information "101" identifying the assignment information "run 20 km" and the support information "you can do it" input to the text box to the assignment sharing device 1 via the network 100 in association with each other. The support information receiving unit 115 receives the support information from the supporter terminal device 4 (step S207). The support information adding unit 116 adds the received support information to the assignment corresponding to the assignment ID "101" (step S208). It is assumed that the support information for the assignment ID "101" and the support information for the assignment ID "105" are further received in a similar manner and are accumulated. Accordingly, the support information illustrated in FIG. 5 is obtained.

It is assumed that the challenger identified by the challenger identification information "user 21" turns on the power of the challenger terminal device 3, which is the challenger's terminal device, and accesses the assignment sharing device 1. Also, it is assumed that the challenger opens a screen for transmitting a transmission request for an assignment in which the challenger is a challenger, and transmits, to the assignment sharing device 1 via the network 100, a transmission request for assignment information included in the assignment-related information including "user 21" in challenger identification information. The transmission request receiving unit 109 receives the transmission request (step S220). The score calculating unit 111 specifies the assignment-related information including the challenger identification information "user 21" included in the transmission request, the assignment ID "101", the assignment ID "103", the assignment ID "104", and the assignment ID "105". Subsequently, the score calculating unit 111 calculates the score of the assignment ID "101". It is assumed that, among the pieces of assignment-related information stored in the assignment-related information storage unit 101, there are five pieces of assignment-related information that have previously included the proposer identification information "user 10" and the challenger identification information "user 21". Thus, the score calculating unit 111 obtains a degree of encouragement "5". Also, it is assumed that, among the pieces of assignment-related information stored in the assignment-related information storage unit 101, there are ten pieces of assignment-related information that have included the proposer identification information "user 10". Thus, the score calculating unit 111 obtains proposer suitability "10". Also, it is assumed that, among the pieces of assignment-related information stored in the assignment-related information storage unit 101, there are seven pieces of assignment-related information that have previously included the challenger identification information "user 21". Thus, the score calculating unit 111 obtains challenger suitability "7". Also, the score calculating unit 111 obtains a degree of intimacy "5" associated with "user 10" and "user 21" among the degrees of intimacy stored in the degree-of-intimacy storage unit 110. Also, the score calculating unit 111 obtains assignment suitability "5" corresponding to the assignment ID "101" stored in the assignment-related information storage unit 101. Because two pieces of support information corresponding to the assignment ID "101" are stored in the assignment-related information storage unit 101, the score calculating unit 111 obtains a degree of support "2". Subsequently, the score calculating unit 111 calculates a score "32" by adding the degree of encouragement "5", the proposer suitability "10", the challenger suitability "7", the degree of intimacy "5", and the assignment suitability "5" (step S221). In a similar manner, the score calculating unit 111 calculates the scores of the other pieces of assignment-related information including the challenger identification information "user 21". The proposed assignment information creating unit 112 creates proposed assignment information by using the assignment ID "101", the assignment ID "103", and the assignment ID "105" other than the assignment ID "104", which is assignment-related information whose score calculated by the score calculating unit 111 is 5 or less, among the pieces of assignment-related information including the challenger identification information "user 21" (step S222). The advertisement information selecting unit 113 selects the advertisement information corresponding to the advertisement ID "204", the advertisement keyword of which includes a keyword "run" included in the assignment information corresponding to the assignment ID "101" included in the proposed assignment information created by the proposed assignment information creating unit 112 (step S223). The advertisement information selecting unit 113 selects a related advertisement also for the assignment ID "103" and the assignment ID "105" included in the other pieces of proposed assignment information. It is assumed that the advertisement information selecting unit 113 selects advertisement identification information "201" for the assignment information corresponding to the assignment ID "103", and does not select any advertisement for the assignment ID "105". In this case, the advertisement information selecting unit 113 sets an advertisement ID "204" as advertisement identification information for the assignment ID "101" and an advertisement ID "201" as advertisement identification information for the assignment ID "103". The assignment information transmitting unit 114 transmits, to the challenger terminal device 3, the proposed assignment information created by the proposed assignment information creating unit 112, proposer identification information corresponding to the individual pieces of assignment information of the proposed assignment information, support information, and the advertisement information selected by the advertisement information selecting unit 113 in association with one another (step S224). Accordingly, the challenger terminal device 3 receives the proposed assignment information and so forth, and displays the individual pieces of assignment information included in the proposed assignment information, the pieces of proposer identification information corresponding to the pieces of assignment information, the support information, and an "approve" button in association with one another.

Figure 8:
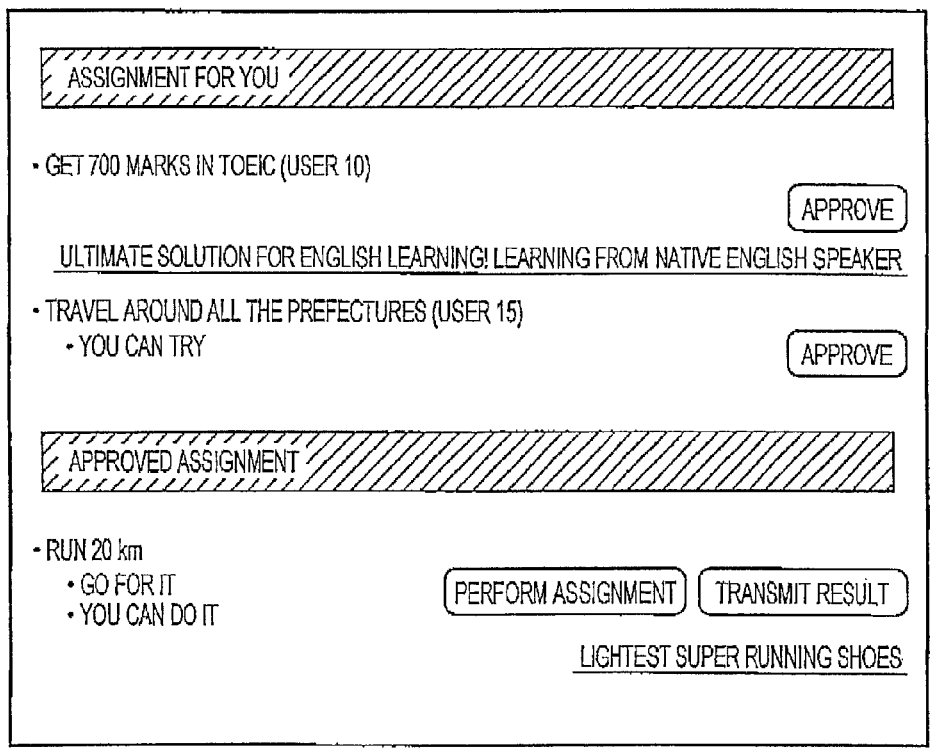
FIG. 8 is a diagram illustrating an example of display of a screen for approving an assignment according to the embodiment.

It is assumed that the challenger operates the challenger terminal device 3 and presses the "approve" button for "run 20 km". Accordingly, the challenger terminal device 3 transmits the assignment identification information "101" identifying the assignment information "run 20 km" to the assignment sharing device 1 via the network 100. The assignment approval receiving unit 117 receives the assignment identification information "101" from the challenger terminal device 3 (step S209). The support information adding unit 116 sets the assignment approval information corresponding to the received assignment identification information "101" to "approved" indicating that the assignment has been approved (step S210). After the assignment identification information identifying the assignment to be approved has been transmitted, the information regarding the assignment ID "101" moves to the lower side of the screen as illustrated in FIG. 8, so that the assignment can be performed.

It is assumed that the challenger presses a "perform assignment" button beside "run 20 km" and starts running while carrying the challenger terminal device 3. At this time, it is assumed that, in the challenger terminal device 3, a GPS measurement function built in the challenger terminal device 3 is activated and collection of GPS coordinate logs is started. It is assumed that, after running 25 km, the challenger presses a "transmit result" button. Accordingly, the challenger terminal device 3 transmits, to the assignment sharing device 1 via the network 100, assignment result information which is information including data of the GPS coordinate logs collected while the challenger is running and the assignment identification information "101". The assignment result information receiving unit 119 detects the assignment result information (step S211). The assignment result information receiving unit 119 determines that, in the assignment-related information storage unit 101, the assignment approval information corresponding to the assignment identification information "101" included in the detected assignment result information is set to "approved" (step S212). Subsequently, the assignment result information receiving unit 119 receives the assignment result information because the assignment approval information corresponding to the assignment identification information "101" is set to "approved" (step S213). After the assignment result information receiving unit 119 receives assignment result information, the assignment result determining unit 120 determines whether or not the assignment result information satisfies the achievement condition of the assignment corresponding to the assignment ID "101", that is, "transmit a GPS log of moving 20 km or more at 6 km/h or more" (step 9214). Here, it is assumed that the achievement condition of the assignment is satisfied. Subsequently, the assignment achievement status information setting unit 121 sets, in the assignment-related information storage unit 101, the assignment achievement status information corresponding to the assignment ID "101" to "achieved". Accordingly, the assignment-related information illustrated in FIG. 5 is stored in the assignment-related information storage unit 101.

After the assignment achievement status information corresponding to the assignment ID "101" has been set to "achieved" in the assignment-related information storage unit 101, the advertisement cost distributing unit 122 obtains a bank account corresponding to the challenger identification information "user 21" corresponding to the assignment ID "101" from a user information storage unit (not illustrated), and performs formalities to transmit "30 yen" represented by the advertisement cost information corresponding to the advertisement ID "204" corresponding to the assignment ID "101" to the bank account (step S216).

After the assignment achievement status information corresponding to the assignment ID "101" has been set to "achieved" in the assignment-related information storage unit 101, the reward distributing unit 123 obtains a bank account corresponding to the challenger identification information "user 21" corresponding to the assignment ID "101" from the user information storage unit (not illustrated), and performs formalities to transmit "100 yen" represented by the reward information corresponding to the assignment ID "101" to the bank account (step S217).

As described above, according to this embodiment, the assignment approving unit 118 sets an assignment selected by a challenger. Accordingly, a challenging spirit of the challenger for the assignment may be incited. For example, motivation of the challenger may be increased and an assignment achievement rate may be increased. Further, according to this embodiment, the assignment result determining unit 120 is capable of automatically determining whether or not an assignment has been achieved, using assignment result information. Accordingly, for example, an achievement status of an assignment may be fairly managed. Further, according to this embodiment, the proposed assignment information creating unit 112 is capable of creating an assignment to be proposed. Accordingly, for example, only an assignment that a challenger wants to achieve may be presented. Further, assignments may be presented in order in which the challenger wants to achieve. Further, according to this embodiment, the score calculating unit 111 is capable of calculating a score using a past proposal history regarding a proposer and a challenger. Accordingly, for example, an assignment may be presented to the challenger in consideration of a past proposal status. Further, according to this embodiment, the score calculating unit 111 is capable of calculating a score using a relationship between a proposer and a challenger and assignment suitability. Accordingly, for example, an assignment may be presented in consideration of a relationship between a proposer and a challenger and assignment suitability. Further, according to this embodiment, the score calculating unit 111 is capable of calculating a score using support information. Accordingly, for example, an assignment may be presented so as to increase motivation in response to a support of a challenger from a third party. Also, according to this embodiment, the advertisement cost distributing unit 122 is capable of distributing advertisement cost to a challenger when an assignment is achieved. Accordingly, for example, motivation for achieving an assignment of a challenger may be increased. Also, according to this embodiment, the reward distributing unit 123 is capable of distributing reward to a challenger when an assignment is achieved. Accordingly, for example, motivation for achieving an assignment of a challenger may be increased.

In this embodiment, a description has been given of a case where the assignment sharing device 1 includes the reward information accepting unit 107, the reward information adding unit 108, and the reward distributing unit 123. Alternatively, the assignment sharing device 1 need not necessarily include the reward information accepting unit 107, the reward information adding unit 108, and the reward distributing unit 123. In a case where the assignment sharing device 1 does not include the reward information accepting unit 107, the reward information adding unit 108, and the reward distributing unit 123, information regarding reward need not necessarily be handled.

In this embodiment, a description has been given of a case where the assignment sharing device 1 includes the advertisement-related information storage unit 104, the advertisement-related information accepting unit 105, the advertisement-related information accumulating unit 106, the advertisement information selecting unit 113, and the advertisement cost distributing unit 122. Alternatively, the assignment sharing device 1 need not necessarily include the advertisement-related information storage unit 104, the advertisement-related information accepting unit 105, the advertisement-related information accumulating unit 106, the advertisement information selecting unit 113, and the advertisement cost distributing unit 122. In a case where the assignment sharing device 1 does not include the advertisement-related information storage unit 104, the advertisement-related information accepting unit 105, the advertisement-related information accumulating unit 106, the advertisement information selecting unit 113, and the advertisement cost distributing unit 122, information regarding an advertisement need not necessarily be handled.

In this embodiment, a description has been given of a case where the assignment sharing device 1 includes the transmission request receiving unit 109. Alternatively, the assignment sharing device 1 need not necessarily include the transmission request receiving unit 109. In a case where the assignment sharing device 1 does not include the transmission request receiving unit 109, the assignment information transmitting unit 114 may transmit assignment information at a certain timing. The certain timing may be set by a user, or may be set by a developer or a manager. The certain timing may be, for example, once a day, or may be a timing at which a new assignment is accumulated in the assignment-related information storage unit 101.

In this embodiment, a description has been given of a case where the assignment sharing device 1 includes the degree-of-intimacy storage unit 110. Alternatively, the assignment sharing device 1 need not necessarily include the degree-of-intimacy storage unit 110. In a case where the assignment sharing device 1 does not include the degree-of-intimacy storage unit 110, the score calculating unit 111 need not necessarily use a degree of intimacy to calculate a score.

In this embodiment, a description has been given of a case where the assignment sharing device 1 includes the support information receiving unit 115 and the support information adding unit 116. Alternatively, the assignment sharing device 1 need not necessarily include the support information receiving unit 115 and the support information adding unit 116. In a case where the assignment sharing device 1 does not include the support information receiving unit 115 and the support information adding unit 116, support information need not necessarily be used to calculate a score.

In this embodiment, a description has been given of a case where the assignment sharing device 1 includes the score calculating unit 111, the proposed assignment information creating unit 112, the degree-of-intimacy storage unit 110, the support information receiving unit 115, and the support information adding unit 116. Alternatively, the assignment sharing device 1 need not necessarily include the score calculating unit 111, the proposed assignment information creating unit 112, the degree-of-intimacy storage unit 110, the support information receiving unit 115, and the support information adding unit 116. In a case where the assignment sharing device 1 does not include the score calculating unit 111, the proposed assignment information creating unit 112, the degree-of-intimacy storage unit 110, the support information receiving unit 115, and the support information adding unit 116, the assignment information transmitting unit 114 may transmit assignment information to all users, or may transmit a part of assignment information, or may transmit, in a case where a new assignment is accumulated in the assignment-related information storage unit 101, the assignment information to a challenger identified by the challenger identification information included in the accumulated assignment-related information.

In this embodiment, a description has been given of a case where the assignment sharing device 1 includes the assignment result determining unit 120. Alternatively, the assignment sharing device 1 need not necessarily include the assignment result determining unit 120. In a case where the assignment sharing device 1 does not include the assignment result determining unit 120, it may be determined that an assignment has been achieved when the assignment result information receiving unit 119 receives information indicating that the assignment has been achieved.

The software implementing the assignment sharing device 1 according to this embodiment is the following program. That is, the program causes a computer, which is accessible to an assignment-related information storage unit configured to store assignment-related information, the assignment-related information including assignment information which is information representing an assignment, proposer identification information identifying a proposer of the assignment, challenger identification information identifying a challenger of the assignment, assignment approval information indicating whether or not the challenger has approved the assignment, and assignment achievement status information representing an achievement status of the assignment, to function as: an assignment information receiving unit configured to receive assignment information, proposer identification information, and challenger identification information from a terminal device of a proposer; an assignment-related information accumulating unit configured to accumulate the assignment information, the proposer identification information, and the challenger identification information received by the assignment information receiving unit in the assignment-related information storage unit so that the assignment information, the proposer identification information, and the challenger identification information are included in a single piece of assignment-related information; an assignment information transmitting unit configured to transmit, to a terminal device of a challenger identified by the challenger identification information included in the assignment-related information stored in the assignment-related information storage unit, assignment information included in the assignment-related information; an assignment approval receiving unit configured to receive, from the terminal device of the challenger, assignment identification information identifying assignment information representing an assignment approved by the challenger; an assignment approving unit configured to set assignment approval information included in assignment-related information including the assignment information identified by the assignment identification information received by the assignment approval receiving unit; an assignment result information receiving unit configured to receive assignment result information from the terminal device of the challenger, the assignment result information being information that is included in assignment-related information together with challenger identification information identifying the challenger and that is related to an execution result of an assignment represented by the assignment information corresponding to the assignment approval information set by the assignment approving unit; and an assignment achievement status information setting unit configured to set, in accordance with the assignment result information received by the assignment result information receiving unit, assignment achievement status information included in assignment-related information including assignment information representing an assignment related to the assignment result information.

In this embodiment, individual processes (individual functions) may be implemented through centralized processing performed by a single device (system), or may be implemented through distributed processing performed by a plurality of devices. In this embodiment, two or more communication units included in a single device may of course be physically implemented by a single unit.

In this embodiment, individual elements may be configured by dedicated hardware. Alternatively, elements that may be implemented by software may be implemented by executing a program. For example, the individual elements may be implemented when a program execution unit, such as a central processing unit (CPU), reads and executes a software program recorded on a recording medium, such as a hard disk or a semiconductor memory.

Note that the functions implemented by the above-described program do not include a function that may be implemented only by hardware. For example, functions that may be implemented only by hardware, such as a modem and an interface card in an obtaining unit for obtaining information and an output unit for outputting information, are not included in the functions implemented by the above-described program.

Figure 9:
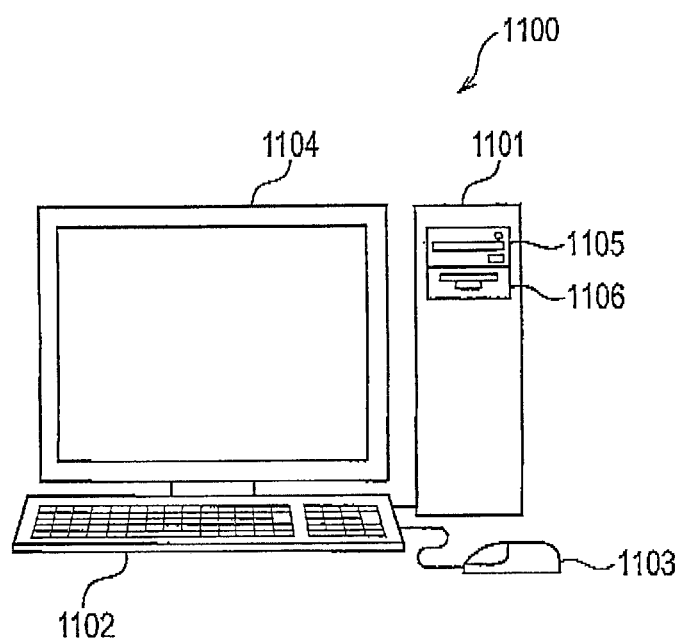
FIG. 9 is a diagram illustrating an example of the appearance of a computer system according to the embodiment.

FIG. 9 is a schematic diagram illustrating an example of the appearance of a computer that executes the above-described program and realizes the above-described embodiment of the present invention. The above-described embodiment may be carried out by computer hardware and a computer program executed by the computer hardware.

Referring to FIG. 9, a computer system 1100 includes a computer 1101 including a CD-ROM drive 1105 and an FD drive 1106, a keyboard 1102, a mouse 1103, and a monitor 1104.

FIG. 10 is a diagram illustrating an internal configuration of the computer system 1100. Referring to FIG. 10, the computer 1101 includes, in addition to the CD-ROM drive 1105 and the FD drive 1106, an MPU 1111, a ROM 1112 for accumulating programs, such as a boot-up program, a RAM 1113 that is connected to the MPU 1111, temporarily accumulates an instruction of an application program, and provides a temporary storage space, a hard disk 1114 that accumulates an application program, a system program, and data, and a bus 1115 that connects the MPU 1111, the ROM 1112, and so forth to one another. The computer 1101 may include a network card (not illustrated) that is used to connect to a LAN.

A program that causes the computer system 1100 to execute the functions of the embodiment of the present invention may be accumulated in the CD-ROM 1121 or the FD 1122, which may be inserted into the CD-ROM drive 1105 or the FD drive 1106, and may be transferred to the hard disk 1114. Alternatively, the program may be transmitted to the computer 1101 via a network (not illustrated) and may be accumulated in the hard disk 1114. The program is loaded to the RAM 1113 at the time of being executed. The program may be directly loaded from the CD-ROM 1121, the FD 1122, or a network.

The program need not necessarily include an operating system (OS) or a third party program or the like that causes the computer 1101 to execute the functions of the embodiment of the present invention. The program may include only an instruction portion that calls an appropriate function (module) in a controlled manner so to as obtain a desired result. A method in which the computer system 1100 operates is available in the related art, and the detailed description thereof is omitted.

The present invention is not limited to the above-described embodiment, and various changes are acceptable, which are included in the scope of the present invention. The "unit" in the above-described embodiment may be replaced with "section" or "circuit".

As described above, the assignment sharing device according to the embodiment of the present invention is capable of providing a mechanism and opportunity to incite a challenging spirit of a user, and is useful as an assignment sharing device.

What is claimed is:

1. A social network assignment sharing device for sharing computer executable assignments between users of a social network service, the social network assignment sharing device comprising:
 a memory storing an assignment-related data table;
 a network interface configured to communicate with a computer network; and
 a processor programmed to:
  receive, over the computer network, from a terminal device of a proposer of the social network service, assignment information including an identifier of at least one computer executable task or a representation of details of the at least one computer executable task, proposer identification information identifying a proposer of an assignment, and challenger identification information identifying a challenger of the social network service to share the assignment with in association with one another;
  accumulate the received assignment information, the received proposer identification information, and the received challenger identification information in a single row entry of the assignment-related data table of the memory;
  share by transmitting over the computer network to a terminal device of the challenger of the social network service identified by the challenger identification information of the single row entry stored in the assignment-related data table of the memory, the representation of the details of the at least one computer executable task included in the single row entry of the assignment-related data table or a representation of details of the at least one computer executable task corresponding to the received identifier;
  receive, over the computer network from the terminal device of the challenger of the social network service, an approved assignment identifier representing an assignment approved by the challenger of the social network service, the approved assignment identifier corresponding to the receive identifier or an identifier corresponding to the representation of the details of the at least one computer executable task;
  set assignment approval information to approved assignment in the single row entry included in the assignment-related data table of the memory corresponding to the received approved assignment identifier;
  receive, from the terminal device of the challenger of the social network service, computer execution result information for the approved assignment identifier;
  set, in accordance with the received execution result information for the approved assignment identifier, assignment achievement status information associated with the approved assignment identifier included in the single row entry of the assignment-related data table of the memory to indicate achieved; and
  transmit, via the computer network to the terminal of the challenger of the social network service, displayable visibly-perceptible information representing the assignment achievement status information of the single row entry.

2. The social network assignment sharing device according to claim 1, wherein
 the execution result information is information regarding an activity performed in an assignment, and
 the processor is further programmed to determine, using the received execution result information, whether or not the approved assignment has been achieved, and set assignment achievement status information based on the determination of whether the approved assignment has been achieved.

3. The social network assignment sharing device according to claim 1, wherein the processor is further programmed to:
 calculate a score for the at least one computer executable task stored in the assignment-related data table of the memory, the score being a value indicating a degree of suitability, for a challenger identified by challenger identification information included in the assignment-related data table of the at least one executable task represented by the assignment identification information; and
 specify row entries of assignment-related information that are included in the assignment-related data table stored in the memory that have identical challenger identification information, and create, using at least a part of the specified row entries of assignment-related information, proposed assignment information which is assignment information to be proposed to a challenger in accordance with the score calculated by the score calculating unit, and
 transmit the created proposed assignment information.

4. The social network assignment sharing device according to claim 3, wherein the processor is further programmed to calculate at least one of: (i) a degree of encouragement, which is a value based on proposer identification information included in the assignment-related data table for which a score is to be calculated and challenger identification information included in the assignment-related data table, (ii) proposer suitability, which is a value based on the proposer identification information included in the assignment-related data table for which the score is to be calculated, and (iii) challenger suitability, which is a value based on the challenger identification information included in the assignment-related data table.

5. The social network assignment sharing device according to claim 3, wherein the processor is further programmed to calculate a score using at least one of: (i) a degree of intimacy, which is a value based on a relationship between a proposer identified by proposer identification information included in assignment-related data table for which the score is to be calculated, and a challenger identified by challenger identification information included in the assignment-related data table, and (ii) assignment suitability, which is a value based on a relationship between the challenger identified by the challenger identification information included in the assignment-related data table for which the score is to be calculated, and an assignment represented by assignment information included in the assignment-related data table for which the score is to be calculated.

6. The social network assignment sharing device according to claim 3, wherein
 the assignment-related data table further includes one or more pieces of support information, which is information regarding a support from a third party other than a proposer identified by proposer identification information included in the assignment-related data table and a challenger identified by challenger identification information included in the assignment-related data table, and the processor is further programmed to:
receive, from a terminal device of the third party, support information and assignment identification information identifying assignment information representing an assignment supported by the third party using the support information in association with each other; and
add the received support information to the assignment-related data table including the assignment information identified by the assignment identification information associated with the support information,
calculate a score using the support information stored in the assignment-related data table, and
transmit, based on the calculated score, assignment information included in the assignment-related data table to the third party.

7. The social network assignment sharing device according to claim 1, wherein the processor is further programmed to:
store, in the assignment-related data table, advertisement information which is information representing an advertisement to be transmitted together with assignment information and advertisement cost information representing advertisement cost for running the advertisement;
select advertisement information related to assignment information included in the assignment-related data table from among pieces of advertisement information stored in the advertisement-related data table; and
distribute at least a part of the advertisement cost to the challenger,
transmit the selected advertisement information, and
distribute, in accordance with the set assignment achievement status information, at least a part of the advertisement cost, to a challenger identified by challenger identification information included in the assignment-related data table having the assignment achievement status information.

8. The social network assignment sharing device according to claim 1, wherein
the assignment-related data table further includes reward information representing a reward for an assignment, and
the processor is further programmed to distribute, in accordance with the set assignment achievement status associated with the approved assignment, at least a part of the reward represented by the reward information, to a challenger identified by challenger identification information included in the assignment-related data table having the set assignment achievement status information.

9. The social network assignment sharing device according to claim 1, wherein the processor is further programmed to:
calculate a degree of intimacy, which is a value corresponding to the relationship between a proposer identified by the proposer identification information included in the assignment-related information for which a score is to be calculated, and a challenger identified by the challenger identification information included in the assignment-related information for which the score is to be calculated; and
determine which challengers to transmit the proposed assignment to based at least in part on the calculated degree of intimacy.

10. The social network assignment sharing device according to claim 1, wherein the processor is further programmed to:
calculate a suitability of an assignment for a challenger based on the social network relationships of the proposer and the challenger; and
determine which challengers to transmit the proposed assignment to based at least in part on the calculated suitability.

11. The social network assignment sharing device according to claim 10, wherein the processor is further programmed to calculate the suitability of an assignment for a challenger based at least in part on an interaction status in the social network service.

12. The social network assignment sharing device according to claim 1, wherein the processor is further programmed to transmit, via the computer network to the terminal of the challenger, information based on the assignment achievement status information of the single row entry, only when the assignment achievement status information indicates achieved, thereby inciting or maintaining a motivation of the challenger by providing displayable visibly-perceptible information based on the achievement of at least one computer executable task proposed by the proposer and pre-approved by the challenger.

13. The social network assignment sharing device according to claim 1, wherein the at least one computer executable task is a mental task or physical task performed by a user having execution results measurable by a computer.

14. A social network assignment sharing method for sharing computer executable assignments between users of a social network service, the social network assignment sharing method comprising:
storing, in a memory of a social network assignment sharing device, an assignment-related data table;
communicating, by the social network assignment sharing device, via a network interface, with a computer network:
receiving, over the computer network, from a terminal device of a proposer of the social network service, assignment information including an identifier of at least one computer executable task or a representation of details of the at least one computer executable task, proposer identification information identifying a proposer of an assignment, and challenger identification information identifying a challenger of the social network service to share the assignment with in association with one another;
accumulating the received assignment information, the received proposer identification information, and the received challenger identification information in a single row entry of the assignment-related data table of the memory;
share, by transmitting over the computer network to a terminal device of the challenger of the social network service identified by the challenger identification information of the single row entry stored in the assignment-related data table of the memory, the representation of details of the at least one computer executable task included in the single row entry of the assignment-related data table or a representation of details of the at least one computer executable task corresponding to the received identifier;
receiving, over the computer network from the terminal device of the challenger of the social network service, an approved assignment identifier representing an assignment approved by the challenger;

setting assignment approval information to approved assignment in the single row entry included in the assignment-related data table of the memory corresponding to the received approved assignment identifier;

receiving, from the terminal device of the challenger of the social network service computer execution result information for the approved assignment identifier; and setting, in accordance with the received execution result information for the approved assignment identifier, assignment achievement status information associated with the approved assignment identifier included in the single row entry of the assignment-related data table of the memory to indicate achieved; and transmit, via the computer network to the terminal of the challenger of the social network service, displayable visibly-perceptible information representing the assignment achievement status information of the single row entry.

15. A non-transitory computer-readable recording medium for sharing computer executable assignments between users of a social network service, the recording medium comprising computer-executable instructions that, when executed, cause a processor of an assignment sharing device to: store, in a memory, an assignment-related data table;

communicate, via a network interface, with a computer network;

receive, over the computer network, from a terminal device of a proposer of the social network service, assignment information including an identifier of at least one computer executable task or a representation of details of the at least one computer executable task, proposer identification information identifying a proposer of an assignment, and challenger identification information identifying a challenger to share the assignment with in association with one another;

accumulate the received assignment information, the received proposer identification information, and the received challenger identification information in a single row entry of the assignment-related data table of the memory;

share, by transmitting over the computer network to a terminal device of the challenger of the social network service identified by the challenger identification information of the single row entry stored in the assignment-related data table of the memory, the representation of the details of the at least one computer executable task included in the single row entry of the assignment-related data table or a representation of details of the at least one computer executable task corresponding to the received identifier;

receive, over the computer network from the terminal device of the challenger of the social network service, an approved assignment identifier representing an assignment approved by the challenger of the social network service, the approved assignment identifier corresponding to the receive identifier or an identifier corresponding to the representation of the details of the at least one computer executable task;

set assignment approval information to approved assignment in the single row entry included in the assignment-related data table of the memory corresponding to the received approved assignment identifier;

receive, from the terminal device of the challenger of the social network service, computer execution result information for the approved assignment identifier;

set, in accordance with the received execution result information for the approved assignment identifier, assignment achievement status information associated with the approved assignment identifier included in the single row entry of the assignment-related data table of the memory to indicate achieved; and transmit, via the computer network to the terminal of the challenger of the social network service, displayable visibly-perceptible information representing the assignment achievement status information of the single row entry.

\* \* \* \* \*